US011516783B2

(12) United States Patent
Liang et al.

(10) Patent No.: US 11,516,783 B2
(45) Date of Patent: Nov. 29, 2022

(54) COMMUNICATION METHOD AND COMMUNICATIONS APPARATUS AND SYSTEM

(71) Applicant: HUAWEI TECHNOLOGIES CO., LTD., Guangdong (CN)

(72) Inventors: Jinyao Liang, Shenzhen (CN); Ting Wang, Shanghai (CN); Yuanjie Li, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 21 days.

(21) Appl. No.: 16/988,407

(22) Filed: Aug. 7, 2020

(65) Prior Publication Data
US 2020/0374868 A1 Nov. 26, 2020

Related U.S. Application Data

(63) Continuation of application No. PCT/CN2018/076030, filed on Feb. 9, 2018.

(51) Int. Cl.
*H04W 72/04* (2009.01)
*H04B 7/06* (2006.01)
(Continued)

(52) U.S. Cl.
CPC ...... *H04W 72/0413* (2013.01); *H04B 7/0626* (2013.01); *H04B 7/0639* (2013.01); *H04L 1/0026* (2013.01); *H04L 5/0057* (2013.01)

(58) Field of Classification Search
CPC .............. H04W 72/0413; H04W 72/04; H04B 7/0626; H04B 7/0639; H04L 1/0026; H04L 5/0057; H04L 5/0007; H04L 5/0091
(Continued)

(56) References Cited

U.S. PATENT DOCUMENTS

| 2011/0299484 | A1 | 12/2011 | Nam et al. | |
|---|---|---|---|---|
| 2014/0036737 | A1* | 2/2014 | Ekpenyong | ........... H04W 8/245 370/328 |
| 2015/0172028 | A1 | 6/2015 | Nam et al. | |

(Continued)

FOREIGN PATENT DOCUMENTS

| CN | 102934381 A | 2/2013 |
|---|---|---|
| CN | 107210857 A | 9/2017 |

(Continued)

OTHER PUBLICATIONS

Renesas Mobile Europe Ltd., "UCI-only PUSCH transmission enhancements," 3GPP TSG-RAN WG1 Meeting #66, R1-112700, Athens, Greece, Aug. 22-26, 2011, 4 pages.

(Continued)

*Primary Examiner* — Fitwi Y Hailegiorgis
(74) *Attorney, Agent, or Firm* — Fish & Richardson P.C.

(57) ABSTRACT

This application provides a communication method and a communications apparatus and system, to help improve transmission reliability. One method includes: obtaining, by a terminal device, a configuration parameter comprising a channel state information (CSI) process feature; and in response to determining that the CSI process feature indicates that further enhancements to coordinated multi-point (FeCoMP) CSI is enabled, sending, by the terminal device uplink control information on a physical uplink channel without sending uplink data on the physical uplink channel.

13 Claims, 5 Drawing Sheets

(51) Int. Cl.
*H04L 1/00* (2006.01)
*H04L 5/00* (2006.01)

(58) Field of Classification Search
USPC .......................................................... 370/329
See application file for complete search history.

(56) References Cited

U.S. PATENT DOCUMENTS

2018/0026769 A1 1/2018 Lee et al.
2020/0169374 A1* 5/2020 Qi ..................... H04L 1/0026

FOREIGN PATENT DOCUMENTS

RU 2573402 C2 1/2016
WO 2013091535 A1 6/2013

OTHER PUBLICATIONS

3GPP TS 38.214 V15.0.0 (Dec. 2017), "3rd Generation Partnership Project;Technical Specification Group Radio Access Network;NR;Physical layer procedures for data (Release 15)," Dec. 2017, 71 pages.
3GPP TS 36.212 V12.9.1 (Jan. 2018), "3rd Generation Partnership Project;Technical Specification Group Radio Access Network;Evolved Universal Terrestrial Radio Access (E-UTRA); Multiplexing and channel coding(Release 12)," Jan. 2018, 95 pages.
CATT, "Discussion on CSI feedback for multi TRP transmission," 3GPP TSG RAN WG1 #90, R1-1712375, Prague, Czechia, Aug. 21-25, 2017, 4 pages.
AT&T, "Offline discussion summary on CSI feedback framework," 3GPP TSG RAN WG1 Meeting #89, R1-1709604, Hangzhou, China, May 15-19, 2017, 2 pages.
3GPP TS 36.213 V15.0.0 (Dec. 2017), "3rd Generation Partnership Project;Technical Specification Group Radio Access Network;Evolved Universal Terrestrial Radio Access (E-UTRA);Physical layer procedures(Release 15)," Dec. 2017, 493 pages.
Intel Corporation, "FeCoMP UE demodulation and CSI reporting requirements," 3GPP TSG-RAN WG4 Meeting #84bis, R4-1710418, Dubrovnik, Croatia, Oct. 9-13, 2017, 6 pages.
3GPP TS 36.331 V15.0.1 (Jan. 2018), "3rd Generation Partnership Project;Technical Specification Group Radio Access Network;Evolved Universal Terrestrial Radio Access (E-UTRA); Radio Resource Control (RRC);Protocol specification (Release 15)," Jan. 2018, 776 pages.
Extended European Search Report issued in European Application No. 18905028.9 dated Nov. 2, 2020, 9 pages.
PCT International Search Report and Written Opinion issued in International Application No. PCT/CN2018/076030 dated Oct. 12, 2018, 15 pages (with English translation).
Office Action issued in Russian Application No. 2020129584/07(053110) dated Jul. 6, 2021, 12 pages (with English translation).

* cited by examiner

COMMUNICATION METHOD AND COMMUNICATIONS APPARATUS AND SYSTEM

CROSS-REFERENCE TO RELATED APPLICATIONS

This application is a continuation of International Patent Application No. PCT/CN2018/076030, filed on Feb. 9, 2018, the disclosure of which is hereby incorporated by reference in its entirety.

TECHNICAL FIELD

This application relates to the communications field, and more specifically, to a communication method and a communications apparatus and system.

BACKGROUND

In coordinated multipoint (Coordinated Multiple Point, CoMP) transmission, to obtain better signal receiving quality, a transmit end device may reduce interference between a plurality of transmission points by using a precoding technology. The transmit end device may determine, based on channel state information (channel state information, CSI) obtained by a receive end device through channel measurement, a precoding matrix adapted to a channel status, and may further precode a to-be-sent signal based on the determined precoding matrix.

In some communications systems, a network device may configure a plurality of channel state information-reference signal (CSI reference signal, CSI-RS) resources to perform channel measurement. For example, in a further enhancements to coordinated multi-point (further enhanced CoMP, FeCoMP) transmission system, the network device may configure two CSI-RS resources and one channel state information-interference measurement (CSI interference measurement, CSI-IM) resource in one CSI process (process). A terminal device may perform channel measurement based on one CSI-RS resource, to feed back one piece of CSI, or may perform channel measurement based on two CSI-RS resources, to feed back two pieces of CSI, where each piece of CSI may be obtained through measurement based on the two CSI-RS resources. In the two cases, sizes of resources required by the terminal device to feed back CSI may be different. In addition, on some physical uplink channels, for example, a physical uplink shared channel (physical uplink shared channel, PUSCH), when resources are sufficient, the terminal device may send the CSI and data together.

Because content to be sent by the terminal device on a physical uplink channel is uncertain, the network device may not be able to correctly receive a signal sent by the terminal device on the physical uplink channel. Therefore, transmission reliability is not high.

SUMMARY

This application provides a communication method and a communications apparatus and system, to improve transmission reliability.

According to a first aspect, a communication method is provided, and includes:

determining a threshold based on a configuration parameter, where the configuration parameter includes one or more of the following: a channel state information process CSI process feature, a feedback feature, a codebook feature, and a resource feature that is of a physical uplink channel; and sending only uplink control information on the physical uplink channel if a resource on the physical uplink channel and the threshold meet a first preset condition.

Based on the foregoing technical solution, a network device and a terminal device may separately determine a threshold based on a configuration parameter, and may further determine, based on a relationship between a resource on a physical uplink channel and the threshold, whether to transmit only uplink control information on the physical uplink channel. In other words, the network device and the terminal device can determine, according to a same rule, content to be transmitted on the physical uplink channel. Therefore, the network device can allocate a proper resource for the uplink control information of the terminal device, to ensure that the terminal device sends the uplink control information on the sufficient resource. In addition, the network device can correctly receive the uplink control information on the allocated physical uplink channel, thereby determining, based on obtained CSI of a downlink channel, a precoding matrix adapted to a channel status, to use the precoding matrix for data transmission. Therefore, this helps improve data transmission reliability.

With reference to the first aspect, in some implementations of the first aspect, the method further includes:

sending the uplink control information and uplink data on the physical uplink channel if the resource on the physical uplink channel and the threshold do not meet the first preset condition.

For example, when the resource on the physical uplink channel is sufficient, the terminal device may further send the uplink control information and uplink data in parallel on the physical uplink channel. This helps improve resource utilization, and does not affect correct receiving of the uplink control information. On the whole, this helps improve transmission performance of a communications system.

According to a second aspect, a communication method is provided. The method includes:

determining a threshold based on a configuration parameter, where the configuration parameter includes at least one of the following: a channel state information process CSI process feature, a feedback feature, a codebook feature, and a resource feature that is of a physical uplink channel; and receiving only uplink control information on the physical uplink channel if a resource on the physical uplink channel and the threshold meet a first preset condition.

Based on the foregoing technical solution, a network device and a terminal device may separately determine a threshold based on a configuration parameter, and may further determine, based on a relationship between a resource on a physical uplink channel and the threshold, whether to transmit only uplink control information on the physical uplink channel. In other words, the network device and the terminal device can determine, according to a same rule, content to be transmitted on the physical uplink channel. Therefore, the network device can allocate a proper resource for the uplink control information of the terminal device, to ensure that the terminal device sends the uplink control information on the sufficient resource. In addition, the network device can correctly receive the uplink control information on the allocated physical uplink channel, thereby determining, based on obtained channel state information of a downlink channel, a precoding matrix adapted to a channel status, to use the precoding matrix for data transmission. Therefore, this helps improve data transmission reliability.

With reference to the second aspect, in some implementations of the second aspect, the method further includes:

receiving the uplink control information and uplink data on the physical uplink channel if the resource on the physical uplink channel and the threshold do not meet the first preset condition.

For example, when the resource on the physical uplink channel is sufficient, the terminal device may further send the uplink control information and uplink data in parallel on the physical uplink channel. This helps improve resource utilization, and does not affect correct receiving of the uplink control information. On the whole, this helps improve transmission performance of a communications system.

With reference to the first aspect or the second aspect, in some possible implementations, the threshold is X resource units, the physical uplink channel occupies P resource units, and X and P are positive integers; and the first preset condition includes:

$P<X$;

$P \leq X$;

$P \leq X \pm T$, where T is a predefined value or is indicated by a network device;

$P<X/2$; or $P<2X$.

The several possible forms of the first preset condition are enumerated above. When the resource on the physical uplink channel and the threshold meet any one of the foregoing enumerated forms, only the uplink control information is sent on the physical uplink channel. Otherwise, the uplink control information and the uplink data are sent on the physical uplink channel.

It should be noted that, when one of the foregoing enumerated forms is used as the first preset condition, whether the resource on the physical uplink channel and the threshold meet the first preset condition is determined based on a same form. For example, when $P<X$, only the uplink control information is sent on the physical uplink channel; and when $P \geq X$, the uplink control information and the uplink data are sent on the physical uplink channel.

It should be understood that, only the several possible cases of the first preset condition are enumerated above. There may be one or more thresholds. The threshold may be a specific value, or may be a range. This is not limited in this application.

With reference to the first aspect or the second aspect, in some possible implementations, the resource unit includes a resource block RB, a symbol, or a resource element RE.

It should be understood that, the resource units enumerated above are merely examples for description, and the resource unit may be any possible resource unit of a resource in time domain, frequency domain, or time-frequency domain. In other words, the resource unit may be any one time domain unit, frequency domain unit, or time-frequency unit. This is not limited in this embodiment of this application.

With reference to the first aspect or the second aspect, in some possible implementations, the threshold is greater than or equal to a minimum resource used to transmit the uplink control information.

To be specific, it can be ensured, only when the threshold is greater than or equal to the minimum resource used to transmit the uplink control information, that there is a sufficient resource to transmit the uplink control information. That is, reliability of data transmission is ensured.

With reference to the first aspect or the second aspect, in some possible implementations, the determining a threshold based on a configuration parameter includes:

determining a coefficient based on the configuration parameter, where the configuration parameter includes a codebook parameter, feedback bandwidth, or a quantity of pieces of fed-back CSI; and determining the threshold based on the coefficient and a pre-obtained reference threshold.

In this implementation, the network device and the terminal device may prestore a correspondence between a plurality of configuration parameters and a plurality of coefficients, and further determine, based on a coefficient corresponding to a configuration parameter of the terminal device and the pre-obtained reference threshold, a threshold corresponding to the configuration parameter.

With reference to the first aspect or the second aspect, in some possible implementations, the resource feature of the physical uplink channel includes a quantity of symbols occupied by a time domain resource on the physical uplink channel, a quantity of RBs corresponding to a frequency domain resource on the physical uplink channel, or a quantity of REs occupied by a time-frequency resource on the physical uplink channel.

It should be understood that, the resource features of the physical uplink channel that are enumerated above are merely examples for description, and the resource feature of the physical uplink channel may be any possible resource unit of the resource in time domain, frequency domain, or time-frequency domain. This is not limited in this embodiment of this application.

Correspondences between different configuration parameters and different thresholds are enumerated below.

Optionally, if the CSI process feature is that further enhancements to coordinated multi-point channel state information FeCoMP CSI is enabled, the threshold is eight RBs, nine RBs, or 10 RBs.

Optionally, if a feedback mode is any one of a mode 2-0, a mode 1-0, or a mode 1-1, the threshold is two RBs or four RBs.

Optionally, if a feedback mode is any one of a mode 3-1, a mode 1-2, a mode 3-0, a mode 2-2, or a mode 3-2, the threshold is eight RBs, nine RBs, or 10 RBs.

Optionally, if the CSI process feature is that FeCoMP CSI is enabled, and a feedback mode is any one of a mode 3-2, a mode 1-2, a mode 3-0, a mode 2-2, or a mode 3-2, the threshold is eight RBs, nine RBs, or 10 RBs.

Optionally, if the CSI process feature is that FeCoMP CSI is enabled, and a codebook type is an enhanced codebook, the threshold is 11 RBs or 12 RBs.

Optionally, if the CSI process feature is that FeCoMP CSI is enabled, and a codebook type is a non-enhanced codebook, the threshold is four RBs or five RBs.

Optionally, if a codebook type in the codebook feature is a type I codebook, the threshold is five RBs, six RBs, seven RBs, or eight RBs.

Optionally, if a codebook type in the codebook feature is a type II codebook, the threshold is 30 RBs, 32 RBs, or 34 RBs.

Optionally, if the feedback feature is a wideband feedback, the threshold is seven RBs, eight RBs, or nine RBs.

Optionally, if the feedback feature is a sub-band feedback, the threshold is 30 RBs, 35 RBs, or 40 RBs.

Optionally, if a beam quantity in the codebook feature is 4, the threshold is 25 RBs, 30 RBs, 32 RBs, 35 RBs, or 40 RBs.

Optionally, if a beam quantity in the codebook feature is 2, the threshold is 15 RBs, 17 RBs, or 20 RBs.

According to a third aspect, a communication method is provided, and includes:

sending only uplink control information on a physical uplink channel when a configuration parameter meets a second preset condition, where the configuration parameter includes one or more of the following: a channel state information process CSI process feature, a feedback feature, and a codebook feature, where the second preset condition includes:

the CSI process feature indicates that further enhancements to coordinated multi-point channel state information FeCoMP CSI is enabled;

the CSI process feature indicates that FeCoMP CSI is enabled, and the feedback feature indicates that a feedback mode is a mode 3-2;

the CSI process feature indicates that FeCoMP CSI is enabled, and the codebook feature indicates that a codebook type is an enhanced CSI codebook;

the feedback feature indicates a sub-band precoding matrix indicator PMI feedback and a sub-band channel quality indicator CQI feedback;

the codebook feature indicates that a codebook type is a type II type II codebook;

the codebook feature indicates that a codebook type is a type II codebook, and the feedback feature indicates a sub-band PMI feedback and a sub-band CQI feedback; or the feedback feature indicates that a quantity of pieces of fed-back CSI is greater than 1.

Based on the foregoing technical solution, a network device and a terminal device may directly determine, based on the configuration parameter, whether to transmit only uplink control information on a physical uplink channel. In other words, the network device and the terminal device can determine, according to a same rule, content to be transmitted on the physical uplink channel. Therefore, the network device can allocate a proper resource for the uplink control information of the terminal device, to ensure that the terminal device sends the uplink control information on the sufficient resource. In addition, the network device can correctly receive the uplink control information on the allocated physical uplink channel, thereby determining, based on obtained CSI of a downlink channel, a precoding matrix adapted to a channel status, to use the precoding matrix for data transmission. Therefore, this helps improve data transmission reliability, and helps improve transmission performance of a communications system. In addition, because it is unnecessary to perform determining based on a relationship between a resource on the physical uplink channel and a threshold, the method is simpler and easier to implement.

With reference to the third aspect, in some implementations of the third aspect, the method further includes:

sending the uplink control information and uplink data on the physical uplink channel when the configuration parameter does not meet the second preset condition.

The network device and the terminal device may transmit the uplink control information and uplink data on the physical uplink channel under some conditions by determining, according to the same rule, the content to be transmitted on the physical uplink channel. This helps improve resource utilization.

According to a fourth aspect, a communication method is provided, and includes:

receiving only uplink control information on a physical uplink channel when a configuration parameter meets a second preset condition, where the configuration parameter includes one or more of the following: a channel state information process CSI process feature, a feedback feature, and a codebook feature, where the second preset condition includes:

the CSI process feature indicates that further enhancements to coordinated multi-point channel state information FeCoMP CSI is enabled:

the CSI process feature indicates that FeCoMP CSI is enabled, and the feedback feature indicates that a feedback mode is a mode 3-2;

the CSI process feature indicates that FeCoMP CSI is enabled, and the codebook feature indicates that a codebook type is an enhanced CSI codebook:

the feedback feature indicates a sub-band precoding matrix indicator PMI feedback and a sub-band channel quality indicator CQI feedback:

the codebook feature indicates that a codebook type is a type II type II codebook;

the codebook feature indicates that a codebook type is a type II codebook, and the feedback feature indicates a sub-band PMI feedback and a sub-band CQI feedback; or the feedback feature indicates that a quantity of pieces of fed-back CSI is greater than 1.

Based on the foregoing technical solution, a network device and a terminal device may directly determine, based on the configuration parameter, whether to transmit only uplink control information on a physical uplink channel. In other words, the network device and the terminal device can determine, according to a same rule, content to be transmitted on the physical uplink channel. Therefore, the network device can allocate a proper resource for the uplink control information of the terminal device, to ensure that the terminal device sends the uplink control information on the sufficient resource. In addition, the network device can correctly receive the uplink control information on the allocated physical uplink channel, thereby determining, based on obtained CSI of a downlink channel, a precoding matrix adapted to a channel status, to use the precoding matrix for data transmission. Therefore, this helps improve data transmission reliability, and helps improve transmission performance of a communications system. In addition, because it is unnecessary to perform determining based on a relationship between a resource on the physical uplink channel and a threshold, the method is simpler and easier to implement.

With reference to the fourth aspect, in some implementations of the fourth aspect, the method further includes:

receiving the uplink control information and uplink data on the physical uplink channel when the configuration parameter does not meet the second preset condition.

The network device and the terminal device may transmit the uplink control information and uplink data on the physical uplink channel under some conditions by determining, according to the same rule, the content to be transmitted on the physical uplink channel. This helps improve resource utilization.

In this embodiment of this application, the configuration parameter of the terminal device may be predefined, for example, defined in a protocol, or may be indicated by the network device. This is not limited in this application.

With reference to the first aspect or the third aspect, in some possible implementations, the method further includes:

receiving information about the configuration parameter.

With reference to the second aspect or the fourth aspect, in some possible implementations, the method further includes:

sending information about the configuration parameter.

Optionally, the information about the configuration parameter is carried in higher layer signaling and/or physical layer signaling.

By way of example rather than limitation, the higher layer signaling may include, for example, a radio resource control (radio resource control, RRC) message or a media access control (media access control, MAC) control element (control element, CE).

By way of example rather than limitation, the physical layer signaling may include, for example, downlink control information (downlink control information, DCI).

It should be understood that, when configuration parameters include more than one of the CSI process feature, the feedback feature, the codebook feature, and the resource feature that is of the physical uplink channel, information about the plurality of configuration parameters may be carried in same signaling, or may be carried in different signaling. This is not limited in this application.

With reference to any one of the first aspect to the fourth aspect, in some possible implementations, the CSI process feature includes: Further enhancements to coordinated multi-point channel state information FeCoMP CSI is enabled, or FeCoMP CSI is unable.

The CSI process feature may also be referred to as a feature of a reporting configuration or a feature of a measurement configuration.

With reference to any one of the first aspect to the fourth aspect, in some possible implementations, the feedback feature includes one or more of the following: a feedback type, the feedback bandwidth, and the quantity of pieces of fed-back CSI.

With reference to any one of the first aspect to the fourth aspect, in some possible implementations, the codebook feature includes the codebook type and/or the codebook parameter.

With reference to any one of the first aspect to the fourth aspect, in some possible implementations, the uplink control information carries one or more pieces of CSI. By way of example rather than limitation, the CSI includes one or more of the following: a rank indication RI (rank indication, RI), a precoding matrix indicator (precoding matrix indicator, PMI), a channel quality indicator (channel quality indicator, CQI), a CSI-RS resource indication (CSI-RS resource indication, CR), or a layer indication (layer indication, LI).

According to a fifth aspect, a terminal device is provided. The terminal device has functions of implementing the terminal device in the method designs in the first aspect or the third aspect. The functions may be implemented by hardware, or may be implemented by hardware executing corresponding software. The hardware or software includes one or more units corresponding to the functions.

According to a sixth aspect, a network device is provided. The network device has functions of implementing the network device in the method designs in the second aspect or the fourth aspect. The functions may be implemented by hardware, or may be implemented by hardware executing corresponding software. The hardware or software includes one or more units corresponding to the functions.

According to a seventh aspect, a terminal device is provided, and includes a transceiver, a processor, and a memory. The processor is configured to control the transceiver to send and receive a signal. The memory is configured to store a computer program. The processor is configured to invoke the computer program from the memory and run the computer program, so that the terminal device performs the method according to any possible implementation in the first aspect or the third aspect and the second aspect or the fourth aspect.

According to an eighth aspect, a network device is provided, and includes a transceiver, a processor, and a memory. The processor is configured to control the transceiver to send and receive a signal. The memory is configured to store a computer program. The processor is configured to invoke the computer program from the memory and run the computer program, so that the network device performs the method according to any one of the second aspect, the fourth aspect, or the possible implementations of the second aspect or the fourth aspect.

According to a ninth aspect, a communications apparatus is provided. The communications apparatus may be the terminal device in the foregoing method designs, or may be a chip disposed in a terminal device. The communications apparatus includes a processor. The processor is coupled to a memory, and may be configured to execute an instruction in the memory, to implement the method performed by the terminal device according to any one of the first aspect, the third aspect, or the possible implementations of the first aspect or the third aspect. Optionally, the communications apparatus further includes the memory. Optionally, the communications apparatus further includes a communications interface. The processor is coupled to the communications interface.

According to a tenth aspect, a communications apparatus is provided. The communications apparatus may be the network device in the foregoing method designs, or may be a chip disposed in a network device. The communications apparatus includes a processor. The processor is coupled to a memory, and may be configured to execute an instruction in the memory, to implement the method performed by the network device according to any one of the second aspect, the fourth aspect, or the possible implementations of the second aspect or the fourth aspect. Optionally, the communications apparatus further includes the memory. Optionally, the communications apparatus further includes a communications interface. The processor is coupled to the communications interface.

According to an eleventh aspect, a computer program product is provided. The computer program product includes computer program code. When the computer program code is run on a computer, the computer is enabled to perform the methods in the foregoing aspects.

According to a twelfth aspect, a computer-readable medium is provided. The computer-readable medium stores program code. When the computer program code is run on a computer, the computer is enabled to perform the methods in the foregoing aspects.

According to a thirteenth aspect, a chip system is provided. The chip system includes a processor, configured to support a terminal device in implementing the functions in the foregoing aspects, for example, generating, receiving, sending, or processing the data and/or the information in the foregoing methods. In a possible design, the chip system further includes a memory. The memory is configured to store a program instruction and data that are necessary for the terminal device. The chip system may include a chip, or may include a chip and another discrete component.

According to a fourteenth aspect, a chip system is provided. The chip system includes a processor, configured to support a network device in implementing the functions in the foregoing aspects, for example, generating, receiving, sending, or processing the data and/or the information in the foregoing methods. In a possible design, the chip system further includes a memory. The memory is configured to store a program instruction and data that are necessary for the network device. The chip system may include a chip, or may include a chip and another discrete component.

DESCRIPTION OF EMBODIMENTS

The following describes technical solutions in this application with reference to accompanying drawings.

The technical solutions in embodiments of this application may be applied to various communications systems, such as a global system for mobile communications (Global System of Mobile communication, GSM) system, a code division multiple access (Code Division Multiple Access, CDMA) system, a wideband code division multiple access (Wideband Code Division Multiple Access, WCDMA) system, a general packet radio service (General Packet Radio Service, GPRS) system, a long term evolution (Long Term Evolution, LTE) system, an LTE frequency division duplex (Frequency Division Duplex, FDD) system, an LTE time division duplex (Time Division Duplex, TDD) system, a universal mobile telecommunications system (Universal Mobile Telecommunication System, UMTS) system, a worldwide interoperability for microwave access (Worldwide Interoperability for Microwave Access, WiMAX) communications system, a fifth-generation (5th Generation, 5G) system, or a new radio (New Radio, NR) system.

Figure 1:
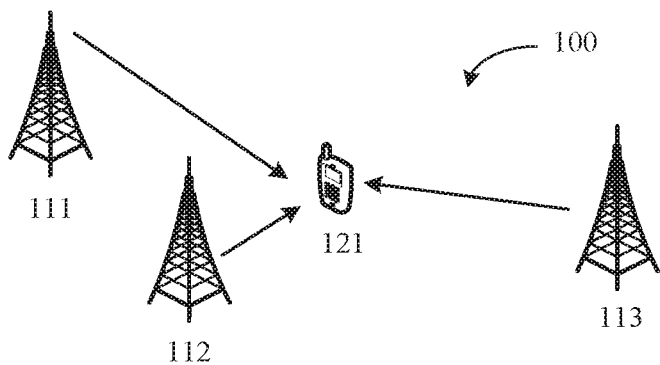
FIG. 1 is a schematic diagram of a communications system to which a communication method in embodiments of this application is applicable.

For ease of understanding the embodiments of this application, a communications system shown in FIG. 1 is first used as an example to describe in detail a communications system applicable to the embodiments of this application. FIG. 1 is a schematic diagram of the wireless communications system 100 applicable to the embodiments of this application. As shown in FIG. 1, the wireless communications system 100 may include one or more network devices, for example, a network device #1 111, a network device #2 112, and a network device #3 113 that are shown in FIG. 1. The wireless communications system 100 may further include one or more terminal devices, for example, a terminal device 121 shown in FIG. 1. The wireless communications system 100 may support CoMP transmission. To be specific, a plurality of cells or a plurality of network devices may coordinately participate in transmitting data to one terminal device or jointly receive data sent by one terminal device, or a plurality of cells or a plurality of network devices perform coordinated scheduling or coordinated beamforming. The plurality of cells may be served by a same network device or different network devices, and may be selected based on a channel gain or a path loss, received signal strength, a received signal instruction, or the like.

It should be understood that, the network device in the wireless communications system may be any device having a wireless transceiver function or a chip that may be disposed in the device. The device includes but is not limited to an evolved NodeB (evolved NodeB, eNB), a radio network controller (Radio Network Controller, RNC), a NodeB (NodeB, NB), a base station controller (Base Station Controller, BSC), a base transceiver station (Base Transceiver Station, BTS), a home base station (for example, a Home evolved NodeB, or a Home NodeB, HNB), a baseband unit (BaseBand Unit, BBU), or an access point (Access Point, AP), a wireless relay node, a wireless backhaul node, a transmission point (transmission point, TP), a transmission reception point (transmission and reception point, TRP), or the like in a wireless fidelity (Wireless Fidelity, Wi-Fi) system, may be a gNB or a transmission point (TRP or TP) in a 5G, for example, NR, system, or one antenna panel of or one group (including a plurality of antenna panels) of antenna panels of a base station in a 5G system, or may be a network node that is included in a gNB or a transmission point, for example, a baseband unit (BBU) or a distributed unit (distributed unit, DU).

In some deployment, the gNB may include a centralized unit (centralized unit, CU) and a DU. The gNB may further include a radio frequency unit (radio unit, RU). The CU implements some functions of the gNB, and the DU implements some functions of the gNB. For example, the CU implements functions of a radio resource control (radio resource control, RRC) layer and a packet data convergence protocol (packet data convergence protocol, PDCP) layer, and the DU implements functions of a radio link control (radio link control, RLC) layer, a media access control (media access control, MAC) layer, and a physical layer (physical, PHY). Information on the RRC layer eventually becomes information on the PHY layer, or is converted from information on the PHY layer. Therefore, in such an architecture, higher layer signaling, such as RRC layer signaling or PHCP layer signaling, may also be considered as being sent by the DU or sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

It should be further understood that, the terminal device in the wireless communications system may also be referred to as user equipment (user equipment, UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone (mobile phone), a tablet computer (Pad), a computer with a wireless transceiver function, a virtual reality (Virtual Reality, VR) terminal device, an augmented reality (Augmented Reality, AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in the embodiments of this application. In this application, the foregoing terminal device and a chip that may be disposed in the foregoing terminal device are collectively referred to as terminal devices.

Optionally, in the communications system 100 shown in FIG. 1, one of the network device #1 to the network device #3 (for example, the network device #1) may be a serving network device. The serving network device may be a network device providing at least one service in an RRC connection, a non-access stratum (non-access stratum, NAS) mobility management, and security input for the terminal device by using a wireless air interface protocol. Optionally, the network device #2 and the network device #3 may be coordinated network devices. The serving network device may send control signaling to the terminal device, and the coordinated network devices may send data to the terminal device; the serving network device may send control signaling to the terminal device, and the serving network device and the coordinated network devices may send data to the terminal device; or both the serving network device and the coordinated network devices may send control signaling to the terminal device, and both the serving network device and the coordinated network devices may send data to the terminal device. Alternatively, the coordinated network devices may send control signaling to the terminal device, and at least one of the serving network device and the coordinated network devices may send data to the terminal device, or the coordinated network devices may send control signaling and data to the terminal device. This is not particularly limited in the embodiments of this application.

Optionally, in the communications system 100 shown in FIG. 1, the network device #1 to the network device #3 may all be serving network devices.

It should be understood that, merely for ease of understanding, FIG. 1 schematically shows the network device #1 to the network device #3 and the terminal device. However, this should not constitute any limitation on this application. The wireless communications system may further include more or fewer network devices, or may include more terminal devices. Different terminal devices may communicate with a same network device or different network devices. Quantities of network devices communicating with the different terminal devices may be the same or different. This is not limited in this application.

In a CoMP transmission scenario, to obtain better channel receiving quality, a transmit end device may reduce interference between a plurality of transmission points by using a precoding technology. Specifically, the transmit end device may send a reference signal used for channel measurement, so that a receive end device performs channel measurement based on the received reference signal. The receive end device sends CSI obtained through channel measurement to the transmit end device, so that the transmit end device determines, based on the CSI, a precoding matrix adapted to a channel status, thereby precoding and sending a to-be-sent signal based on the precoding matrix.

The reference signal used by the receive end device to perform channel measurement may include, for example, a CSI-RS that can be used for downlink channel measurement and an SRS that can be used for uplink channel measurement. It should be understood that, the foregoing enumerations of the reference signal are merely examples for description, and shall not constitute any limitation on this application. This application does not exclude a possibility of defining another reference signal in a future protocol to implement a same or similar function, for example, a demodulation reference signal (demodulation reference signal, DMRS), a tracking reference signal (tracking reference signal, TRS), and a phase tracking reference signal (phase tracking reference signal, PTRS). CSI measurement and a feedback are performed on a channel state information-reference signal (channel state information reference signal, CS-RS) resource.

In addition, the CSI sent by the receive end device to the transmit end device may include, for example, a precoding matrix indicator (precoding matrix indicator, PMI), a rank indication (rank indication, RI), a channel quality indicator (channel quality indicator, CQI), and a CSI-RS resource indication (CSI-RS Resource Indication, CR). It should be understood that, the specific content of the CSI that is enumerated above are merely examples for description, and shall not constitute any limitation on this application. The CSI sent by the receive end device to the transmit end device may include one or more of the foregoing enumerations, or may also include information other than the foregoing enumeration and used to represent CSI. This is not limited in this application.

Currently, in some communications systems, a network device may configure a plurality of CSI-RS resources to perform channel measurement. For example, in a FeCoMP system, the terminal device may perform coordinated transmission with one or more network devices. For example, the terminal device 121 shown in the figure may perform coordinated transmission with the network device #1 111 and the network device #2 112 that are shown in FIG. 1. In this case, the network device (for example, the network device #1 111) may configure two CSI-RS resources (namely, non zero power CSI-RS resources) and one CSI-IM resource (that is, a zero power CSI-RS resource) in one CSI process (CSI process). One of the two CSI-RS resources may be configured for one network device that performs coordinated transmission with a terminal device, and the other of the two CSI-RS resources may be configured for another network device that performs coordinated transmission with the terminal device. For example, one CSI-RS resource may be configured for the network device #1 shown in FIG. 1, and another CSI-RS resource may be configured for the network device #2 shown in FIG. 1.

When feeding back CSI, a terminal device may feed back one piece of CSI based on a CSI-RS resource configured by one of two network devices that has better transmission performance, or may separately perform channel measurement based on CSI-RS resources configured by two network devices, and feed back two pieces of CSI.

Herein, it should be particularly noted that, one piece of CSI may correspond to at least one of the following: one channel, one codebook, one or more codebook subsets, one or one group of resources used for channel measurement, one network device, one measurement configuration (for example, a measurement setting), one reporting configuration (for example, a reporting setting), and the like. In other words, one piece of CSI may be a measurement result obtained by performing channel measurement based on a channel between one network device and one terminal device, may be a measurement result obtained by performing channel measurement based on one codebook, may be a measurement result obtained by performing channel measurement based on one or more codebook subsets, may be a measurement result obtained by performing channel measurement based on one network device, may be a measurement result obtained by performing channel measurement based on one or one group of CSI-RS resources, or may be a measurement result obtained by performing channel measurement based on one measurement configuration. The group of CSI-RS resources may include one or more CSI-RS resources, and may be used by one or more network devices to send a CSI-RS.

Because a network device may configure two CSI-RS resources in one CSI process, a terminal device may perform channel measurement based on one or two CSI-RS resources, and feed back one or two pieces of CSI. When the terminal device feeds back the one or two pieces of CSI to a same network device (for example, a serving network device), payload sizes for feeding back one piece of CSI and two pieces of CSI are different. Therefore, required resources are also different.

If the network device cannot learn of, in advance, a size of a resource required by the terminal device for a feedback, the network device cannot configure a corresponding resource for a physical uplink channel. When the terminal device requires a relatively large resource for a feedback, there is a possibility that a feedback resource is insufficient.

In addition, when a physical uplink resource configured by the network device is sufficient, the terminal device may further send uplink data when feeding back the CSI, for example, send CSI and uplink data on a PUSCH.

However, the network device cannot know, in advance, whether the terminal device sends uplink control information or uplink data on the physical uplink channel, and therefore cannot implement correct receiving. Consequently, transmission reliability is reduced.

In view of this, this application provides a communication method. A network device can configure a physical uplink resource for a terminal device based on a configuration parameter, and the terminal device may also determine, based on the configuration parameter, whether to send only uplink control information on the physical uplink resource, so that the network device correctly receives a signal on the physical uplink resource configured for the terminal device.

To facilitate understanding of the embodiments of this application, the following first briefly describes several nouns or terms in this application.

1. A physical uplink channel is a channel that may be used to carry uplink control information and/or uplink data. For example, the physical uplink channel may include a physical uplink control channel (physical uplink control channel. PUCCH) and a physical uplink shared channel (PUSCH) that are defined in an LTE protocol or an NR protocol and another uplink channel that has the foregoing functions and that is defined as a network evolves.

2. Uplink control information (uplink control information, UCI) may be used to carry at least one of CSI (for example, the CSI may include one or more of the foregoing enumerated PMI, RI, CQI, and CRI), acknowledgment (Acknowledgement, ACK)/negative acknowledgment (Negative Acknowledgment, NACK), and an uplink scheduling request (scheduling request, SR).

3. A resource element (resource element, RE) is also referred to as a resource element, may correspond to one symbol in time domain, and may correspond to one subcarrier in frequency domain. In the embodiments of this application, the RE may be an example of a resource unit.

4. One resource block (resource block, RB) occupies $N_{sc}^{RB}$ contiguous subcarriers in frequency domain, where $N_{sc}^{RB}$ is a positive integer. For example, in the LTE protocol, $N_{sc}^{RB}$ may be equal to 12. In the embodiments of this application, the RB may be defined in terms of only a frequency domain resource. In other words, a quantity of time domain resources occupied by the RB in time domain is not limited. In the embodiments of this application, the RB may be another example of the resource unit.

5. A symbol (symbol) is a minimum unit of a time domain resource. A time length of one symbol is not limited in the embodiments of this application. The length of the symbol may vary with different subcarrier spacings. Symbols may include an uplink symbol and a downlink symbol. By way of example rather than limitation, the uplink symbol may be, for example, referred to as a single carrier frequency division multiple access (Single Carrier-Frequency Division Multiple Access, SC-FDMA) symbol or an orthogonal frequency division multiplexing (Orthogonal Frequency Division Multiplexing, OFDM) symbol. The downlink symbol may be, for example, referred to as an OFDM symbol. In the embodiments of this application, the symbol may be still another example of the resource unit.

6. A resource unit may be used as a measurement unit of a resource occupied in time domain, frequency domain, or time-frequency domain. In the embodiments of this application, the resource unit may include, for example, the symbol, the RE, the RB, and a subcarrier. This is not limited in this application.

It should be particularly noted that, in the embodiments of this application, "a terminal device sends only uplink control information on a physical uplink channel" is mentioned for a plurality of times. Such a description is relative to uplink data. In other words, for the uplink data and the uplink control information, the terminal device sends only the uplink control information but does not send the uplink data. Therefore, "a terminal device sends only uplink control information on a physical uplink channel" does not mean that the terminal device does not send another signal, for example, a demodulation reference signal (DMRS), on the physical uplink channel. A person skilled in the art may understand that in some cases, if the terminal device sends only the uplink control information on the physical uplink channel but does not send the demodulation reference signal on the physical uplink channel, a network device still cannot correctly receive the uplink control information. In addition, when the terminal device sends only the uplink control information on the physical uplink channel, this application does not exclude a possibility that the terminal device sends a reference signal other than the DMRS, for example, an SRS, on the physical uplink channel.

It should be further noted that, in the embodiments of this application, a "protocol" may be a standard protocol in the communications field, for example, may include an LTE protocol, an NR protocol, and a related protocol applied to a future communications system. This is not limited in this application.

It should be further noted that, in the embodiments of this application, "predefining" may be implemented by prestoring corresponding code or table in a device (for example, including a terminal device and a network device) or in another manner that may be used to indicate related information. A specific implementation of "predefining" is not limited in this application. For example, predefining may mean defining in a protocol.

It should be further noted that, in the embodiments of this application, terms "network" and "system" are usually alternately used, but a person skilled in the art may understood meanings of the terms "network" and "system". "Information (information)", "signal (signal)", "message (message)", and "channel (channel)" may be interchangeably used sometimes. It should be noted that, meanings expressed by the terms are consistent when differences between the terms are not emphasized. "Of (of)", "corresponding, relevant (corresponding, relevant)", and "corresponding (corresponding)" may be interchangeably used sometimes. It should be noted that, meanings expressed by the terms are consistent when differences between the terms are not emphasized.

It should be further noted that, in the embodiments of this application, "reporting" and "feedback" are often used alternately, but a person skilled in the art may understand meanings of "reporting" and "feedback". For a terminal device, both CSI reporting and a CSI feedback may be essentially CSI sending on a physical uplink channel. Therefore, in the embodiments of this application, when a difference between "reporting" and "feedback" is not emphasized, meanings to be expressed by "reporting" and "feedback" are consistent.

It should be noted that, "and/or" describes an association relationship between associated objects and represents that three relationships may exist. For example, A and/or B may represent the following three cases: Only A exists, both A and B exist, and only B exists. The character "/" generally indicates an "or" relationship between the associated objects. "At least one" means one or more. "At least one of A and B", similar to "A and/or B", describes an association relationship between associated objects and represents that three relationships may exist. For example, at least one of A and B may represent the following three cases: Only A exists, both A and B exist, and only B exists. The following describes in detail the technical solutions provided in this application with reference to the accompanying drawings.

It should be understood that, the communication method provided in this application may be applicable to a wireless communications system, for example, the wireless communications system 100 shown in FIG. 1. A terminal device in the embodiments of this application may simultaneously communicate with one or more network devices. For example, the network device in the embodiments of this application may correspond to any one or more of the network device #1 111, the network device #2 112, and the network device #3 113 in FIG. 1. The terminal device in the embodiments of this application may correspond to the terminal device 121 in FIG. 1.

Without loss of generality, the following describes the embodiments of this application in detail by using an interaction process between one terminal device and one network device as an example. The terminal device may be any terminal device that is in a wireless communications system and that has a wireless connection relationship with one or more network devices. It may be understood that any terminal device in the wireless communications system may implement wireless communication based on a same technical solution. This is not limited in this application.

Figure 2:
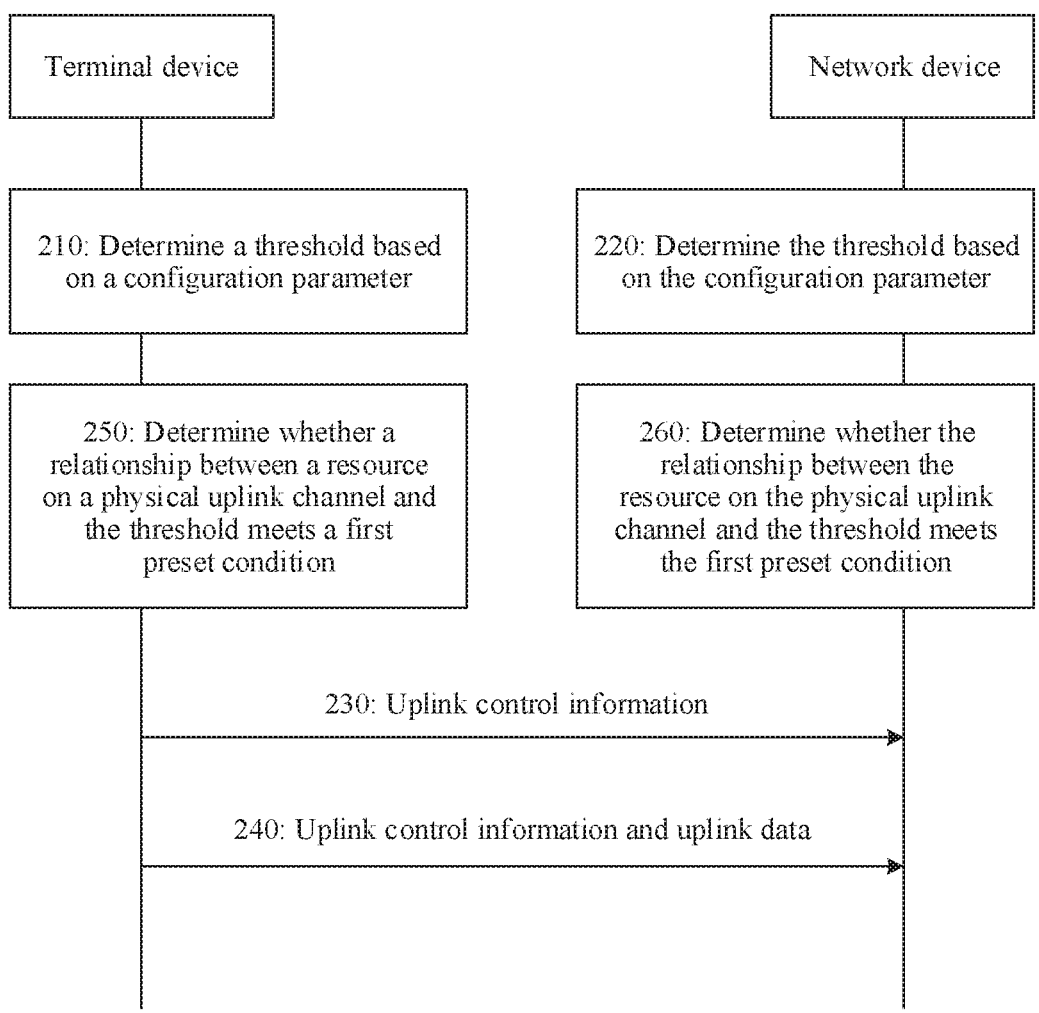
FIG. 2 is a schematic flowchart of a communication method according to an embodiment of this application.

FIG. 2 is a schematic flowchart of a communication method 200 according to an embodiment of this application from a perspective of device interaction. As shown in the figure, the method 200 shown in FIG. 2 may include step 210 to step 240. The following describes the method 200 in detail with reference to FIG. 2.

In step 210, a terminal device determines a threshold based on a configuration parameter, where the configuration parameter includes one or more of the following: a CSI process feature, a feedback feature, a codebook feature, and a resource feature that is of a physical uplink channel.

Correspondingly, in step 220, a network device determines the threshold based on the configuration parameter, where the configuration parameter includes the one or more of the following: the CSI process feature, the feedback feature, the codebook feature, and the resource feature that is of the physical uplink channel.

Specifically, the terminal device may determine, based on the configuration parameter, the threshold corresponding to the configuration parameter. In other words, there is a correspondence between configuration parameters and thresholds. The configuration parameter may be a configuration parameter corresponding to the terminal device. Alternatively, the configuration parameter corresponding to the terminal device may be referred to as a configuration parameter of the terminal device for short. The configuration parameter may be understood as a parameter that is configured for the terminal device and that may be used to indicate a feature of one or more of, for example, a CSI process, a feedback, a resource, and a codebook. The configuration parameter may include only one of the foregoing enumerations, or may include some or all of the foregoing enumerations.

When content or parameters included in the configuration parameter are different, corresponding thresholds may also be different. For example, a threshold determined based only on the CSI process feature may be different from a threshold determined based only on the feedback feature. For another example, thresholds determined based on different codebook types may be different. For another example, a threshold determined based on the CSI process feature and the feedback feature may be different from a threshold determined based only on the CS process feature. For still another example, thresholds determined based on different physical uplink channel resources may also be different. The following describes in detail the correspondences between the configuration parameters and the thresholds with reference to specific examples.

Specific content included in the configuration parameter is first described in detail herein.

1. The CSI process feature may indicate a channel measurement manner and a feedback manner that are used by the terminal device in a current communications system. Optionally, the CSI process feature includes: FeCoMP CSI is enabled (enable), or FeCoMP CSI is unable (unable). That the FeCoMP CSI is enabled may be understood as performing channel measurement and a feedback based on FeCoMP, and that the FeCoMP CSI is unable may be understood as performing channel measurement and a feedback based on conventional CoMP. In other words, whether the FeCoMP CSI is enabled means whether channel measurement and a feedback in a FeCoMP scenario are triggered.

Optionally, the CSI process feature may also be a feature of a reporting configuration, a feature of a measurement configuration, or the like. For example, the feature of the reporting configuration is determined by using information carried in the reporting configuration, or the feature of the measurement configuration is determined by using information carried in the measurement configuration.

It should be noted that, in the FeCoMP scenario, a higher layer parameter may be used to configure two CSI-RS resources and one CSI-IM resource for one CSI process. In this case, the terminal device may perform channel measurement based only on one of the two CSI-RS resources, or may perform channel measurement based on the two CSI-RS resources. This may be related to a channel state that corresponds to the two CSI-RS resources and that is between a network device and the terminal device, or may be related to transmission performance of a network device corresponding to the two CSI-RS resources. Therefore, CR fed back by the terminal device in the FeCoMP scenario may be 0 or 1. To be specific, one piece of CSI is sent only for one network device. Alternatively, the CRI may be 2. To be specific, two pieces of CSI are sent for two network devices. Alternatively, the terminal device may determine, based on configuration information in a CSI process configuration, whether FeCoMP CSI is enabled in the CSI process for measurement and/or feedback. For example, if two NZP CSI-RS resources and one CSI-IM resource are configured, it may be determined that the CSI process is that FeCoMP CSI is enabled for measurement and/or feedback.

Comparatively, in the conventional CoMP scenario, a higher layer parameter may be used to configure one CSI-RS resource and one CSI-IM resource for one CSI process, or may configure a same quantity of a plurality of CSI-RS resources and a plurality of CS-IM resources for one CSI process, for example, may be used to configure M (where M>1, and M is an integer) CSI-RS resources and M CSI-IM resources for one CSI process. Therefore, CSI fed back by the terminal device in the conventional CoMP scenario may be only any integer value from 0 to M−1. That is, only one piece of CSI is sent.

It should be understood that, in the FeCoMP scenario, quantities of the CSI-RS resources and CSI-IM resources that are configured for the CSI process are merely a possible implementation proposed in a current protocol, but this should not constitute any limitation on this application. Quantities of both CSI-RS resources and CSI-IM resources that are configured for one CSI process are not limited in this application. For example, at least two CSI-RS resources may be configured for one CSI process, or one or more CSI-IM resources may be configured for one CSI process.

2. The feedback feature may indicate one or more of the following:

a feedback type of the terminal device, for example, a feedback of one or more of a PMI, an RI, a CQI, and a CRI;

a quantity of pieces of CSI fed back by the terminal device, for example, a feedback of one piece of CSI or a plurality of pieces of CSI; and a type of feedback bandwidth of the terminal device, for example, a wideband or a sub-band, where when the type of the feedback bandwidth is a sub-band, it may be further indicated whether the type of the feedback bandwidth is a UE selected (UE selected) sub-band or a higher layer-configured sub-band.

In other words, the feedback feature may indicate any one of the foregoing enumerations, or may indicate a combination of two or more of the foregoing enumerations, for example, a wideband PMI feedback; a PMI feedback of a higher layer-configured sub-band; a wideband CQI feedback and a CQI feedback of a higher layer-configured sub-band; a wideband RI feedback; an RI feedback of a UE selected sub-band; a wideband CR feedback; a CRI feedback of a UE selected sub-band; and a CSI feedback, where CSI includes a PMI, an RI, and a CQI. It should be understood that, various possible configurations of the feedback feature are enumerated above. However, this is merely an example for description. The feedback feature may be any one or a combination of the foregoing enumerated configurations. For brevity, configurations are not enumerated one by one herein again. The feedback feature is not limited in this application either.

It should be noted that, in the plurality of feedback types enumerated above, the PMI and the CQI may correspond to different feedback bandwidth. In the following embodiments shown below, the wideband feedback may include a CQI wideband feedback and a PMI wideband feedback. The sub-band feedback may include a CQI wideband feedback and a PMI sub-band feedback, a PMI wideband feedback and a CQI sub-band feedback, or a CQI sub-band feedback and a PMI sub-band feedback. However, it should be understood that, in this application, merely for ease of differentiation and description, the wideband feedback and the sub-band feedback are limited above. This application does not exclude a possibility that a case in which any one of the CQI and the PMI is a sub-band feedback is included in a category of a wideband feedback. To be specific, the wideband feedback may include: the CQI wideband feedback and the PMI wideband feedback, the CQI wideband feedback and the PMI sub-band feedback, or the PMI wideband feedback and the CQI sub-band feedback. The sub-band feedback may include the CQI sub-band feedback and the PMI sub-band feedback.

In addition, it should be further noted that, a new feedback type may be defined in a future protocol. The new feedback type may also include different feedback bandwidth. Therefore, differentiation between the wideband feedback and the sub-band feedback in this application is not limited to the foregoing enumerated CQI and PMI.

3. The codebook feature may indicate a codebook type and/or a codebook parameter based on which the terminal device performs channel measurement. By way of example rather than limitation, the codebook type includes, for example, a four-antenna (4T) codebook, an eight-antenna (8T) codebook, an enhanced 4T codebook, a class A (Class A) codebook, a class B (Class B) codebook, an enhanced (Advanced) CSI codebook, a non-enhanced codebook, a type I (Type I) single panel (single panel, SP) codebook, a type I (Type I) multiple panel (multiple panel, MP) codebook, a type II (Type II) codebook, and a type II port selection codebook. By way of example rather than limitation, the codebook parameter includes, for example, antenna port quantities in different polarization directions (for example, an antenna port quantity $N_1$ in a horizontal polarization direction and an antenna port quantity $N_2$ in a vertical polarization direction), oversampling factors in the different polarization directions (for example, an oversampling factor $O_1$ in the horizontal polarization direction and an oversampling factor $O_2$ in the vertical polarization direction), beam quantities in the different polarization directions (for example, a beam quantity $L_1$ in the horizontal polarization direction and a beam quantity $L_2$ in the vertical polarization direction), and a codebook subset configuration.

It should be noted that, the non-enhanced codebook is a codebook type, and does not represent a codebook other than an enhanced codebook.

4. The resource feature of the physical uplink channel may indicate a quantity of resource units occupied in different dimensions by the resource on the physical uplink channel allocated to the terminal device. For example, the quantity of the resource units may be a quantity of symbols occupied by the physical uplink channel in time domain, a quantity of RBs occupied by the physical uplink channel in frequency domain, or a quantity of REs occupied by the physical uplink channel in time-frequency domain.

In this embodiment of this application, one or more of the foregoing enumerated configuration parameters may be configured by the network device for the terminal device, or may be predefined.

If the configuration parameter is configured by the network device for the terminal device, optionally, the method further includes: receiving, by the terminal device, information about the configuration parameter.

Correspondingly, the network device sends the information about the configuration parameter.

When the configuration parameter includes a plurality of pieces of content, the network device may indicate different content to the terminal device by using same signaling or different signaling. This is not limited in this application.

Optionally, the information about the configuration parameter is carried in higher layer signaling and/or physical layer signaling.

By way of example rather than limitation, the higher layer signaling includes an RRC message or a MAC CE.

By way of example rather than limitation, the physical layer signaling includes downlink control information.

The downlink control information may be, for example, DCI (downlink control information) in an LTE protocol or an NR protocol, or may be other signaling that is transmitted on a physical downlink control channel and that can be used to carry downlink control information.

It should be understood that, the physical downlink control channel herein may be a PDCCH (physical downlink control channel, physical downlink control channel) or an enhanced physical downlink control channel (enhanced PDCCH, EPDCCH) that is defined in the LTE protocol or the NR protocol, or may be a PDCCH in NR and another downlink channel that has the foregoing functions and that is defined as a network evolves.

Specifically, the foregoing enumerated configuration parameters may be separately indicated in the following manners:

1. CSI process feature: The CSI process feature may be indicated in an explicit or implicit manner.

If the CSI process feature is indicated in the explicit manner, in a possible design, the network device may indicate the CSI process feature by using higher layer signaling. For example, an RRC message includes a FeCoMP CSI enabled field. When the field is set to true, it may indicate that FeCoMP CSI is enabled. When the field is set to false, it may indicate that FeCoMP CSI is unable.

If the CSI process feature is indicated in the implicit manner, in a possible design, the terminal device may determine the CSI process feature based on configuration information that is in a CSI process and that is configured by the network device by using higher layer signaling. For example, when in a reporting configuration in an RRC message, configuration information may be used to indicate that two NZP CSI-RS resources and one CSI-IM resource are configured for one CSI process, it may be considered that the CSI process feature is that FeCoMP CSI is enabled. Otherwise, it is considered that the CSI process feature is that the FeCoMP CSI is unable.

The configuration information in the CSI process may be indicated by using higher layer information. For example, the network device may configure the CSI process by using an RRC message. Alternatively, the configuration information in the CSI process may be jointly indicated by using higher layer information and downlink control information. For example, the network device may configure a plurality of optional CSI processes by using an RRC message, and trigger, when the DCI triggers CSI reporting, measurement and reporting for one of the plurality of optional CSI processes.

Optionally, the CSI process feature may also be referred to as the feature of the reporting configuration, the feature of the measurement configuration, or the like. For example, the feature of the reporting configuration is determined by using information carried in the reporting configuration, or the feature of the measurement configuration is determined by using information carried in the measurement configuration.

2. Feedback feature: In the LTE protocol, the feedback feature may be indicated in a feedback mode (mode). The feedback mode may include, for example, one or more of the following: a mode 1-0, a mode 2-0, a mode 3-0, a mode 1-1, a mode 3-1, a mode 1-2, a mode 2-2, and a mode 3-2. The feedback mode may be indicated by using higher layer signaling. For example, the network device may indicate the feedback mode by using an RRC message, or may indicate the feedback mode by using higher layer signaling and downlink control information, and trigger, when the DCI triggers CSI reporting, a feedback to be performed for one of the plurality of optional feedback modes.

In the NR protocol, a parameter representing the feedback feature may be configured by using higher layer signaling. For example, the parameter of the feedback feature is indicated by using a measurement configuration in an RRC message. Alternatively, the parameter representing the feedback feature may be jointly indicated by using higher layer signaling and DCI. For example, the network device may indicate a plurality of groups of optional parameters of the feedback feature by using the RRC message, and indicate, when the DCI triggers CSI reporting, to perform a feedback for one of the plurality of groups of optional parameters of the feedback feature. Each group of parameters may include, for example, one or more of a feedback type, a quantity of pieces of fed-back CSI, or feedback bandwidth.

3. Codebook feature: The codebook feature may be indicated by using higher layer signaling. For example, a codebook type and/or a codebook parameter are/is indicated by using a reporting configuration in an RRC message. Alternatively, the codebook feature may be jointly indicated by using higher layer signaling and DCI. For example, a plurality of possible codebook types and/or a plurality of groups of possible codebook parameters are indicated by using a reporting configuration in an RRC message, and when DCI triggers CSI reporting, to perform measurement and a feedback based on one of the plurality of possible codebook types and/or one of the plurality of groups of possible codebook parameters is indicated.

It should be understood that, specific indication of the codebook type ma need to be jointly determined by using a plurality of different parameters. For a specific implementation of the specific indication, refer to the prior art. For brevity, detailed description of the process is omitted herein.

4. Resource feature of the physical uplink channel: A resource size and/or location of the physical uplink channel may be indicated by using the network device. For example, a size and a start location of the resource on the physical uplink channel allocated to the terminal device are indicated in DCI, or a start location and an end location of the resource on the physical uplink channel allocated to the terminal device, start locations and a quantity of resources on the physical uplink channel allocated to the terminal device, or a start location and a length of the physical on the uplink channel resource allocated to the terminal device are indicated in DCI.

Optionally, the resource size may be represented by using at least one of a quantity of frequency domain resources RBs, a quantity of time domain resource symbols, and a quantity of REs. The resource location may be at least one of an RB location in frequency domain, a symbol location in time domain, and an RE location in time-frequency domain.

It should be understood that, the foregoing enumerated specific method for indicating the configuration parameter by using the network device may be the same as an implementation in the prior art. For brevity, detailed description of the specific method is omitted herein.

If the configuration parameter is predefined, definitions of the configuration parameter for the network device and the terminal device may be consistent. The configuration parameter may be defined in a protocol, or may be preset by an operator before delivery of a device. This is not limited in this application.

It should be understood that, the foregoing enumerated specific method for obtaining the configuration parameter by the terminal device is merely an example for description, and shall not constitute any limitation on this application. A specific method for obtaining the configuration parameter by the terminal device is not limited in this application.

Optionally, the threshold may be greater than or equal to a minimum resource used to transmit uplink control information. In other words, a value of the threshold may be at least the minimum resource used to transmit the uplink control information. In this way, it can be ensured that the terminal device can send the uplink control information on the physical uplink channel allocated by the network device.

It should be noted that, the threshold may be defined based on a resource in frequency domain, may be defined based on a resource in time domain, or may be defined based on a resource in time-frequency domain. For example, the threshold may be expressed as a quantity of subcarriers or RBs, may be expressed as a quantity of symbols, or may be expressed as a quantity of REs. This is not limited in this application.

In this embodiment of this application, the threshold may have a correspondence with one or more of pieces of the foregoing enumerated specific content included in the configuration parameter. One or more configuration parameters based on which a corresponding threshold is determined may depend on the foregoing enumerations that are included in a configuration parameter currently obtained by the terminal device, or a configuration parameter configured by the network device for the terminal device, or may be predefined in a protocol or indicated by the network device in advance.

For example, if the currently obtained configuration parameter includes only the CSI process feature, the terminal device may determine a threshold corresponding to the CSI process feature. If the currently obtained configuration parameter includes the CSI process feature, the feedback feature, and the codebook feature, the terminal device may determine a threshold corresponding to the CSI process feature, the feedback feature, and the codebook feature. If the currently obtained configuration parameter includes only the resource feature of the physical uplink channel, the terminal device may determine a threshold corresponding to the resource feature of the physical uplink channel.

For another example, if it is defined in a protocol that a corresponding threshold is determined based only on the resource feature of the physical uplink channel, the terminal device may determine the threshold corresponding to the resource feature of the physical uplink channel. If it is defined in a protocol that a corresponding threshold is determined based only on the CSI process feature, the terminal device may determine the threshold corresponding to the CSI process.

Optionally, in step 210, the terminal device and the network device may separately determine the threshold based on the configuration parameter by using any one of the following methods:

Method 1: Determine, based on a correspondence between a plurality of groups of configuration parameters and a plurality of thresholds, the threshold corresponding to the configuration parameter.

Method 2: Determine, based on a coefficient corresponding to a configuration parameter and a pre-obtained reference threshold, the threshold corresponding to the configuration parameter.

In Method 1, the correspondence between the plurality of groups of configuration parameters and the plurality of thresholds may be predefined, for example, defined in a protocol, or may be indicated by the network device to the terminal device. This is not limited in this application. Each group of configuration parameters may include one or more of the CSI process feature, the feedback feature, the codebook feature, and the resource feature that is of the physical uplink channel. The network device and/or the terminal device may determine a corresponding threshold based on the configuration parameter of the terminal device.

In Method 2, the coefficient corresponding to the configuration parameter may be indicated by the network device to the terminal device, or may be determined based on a pre-obtained correspondence between a plurality of groups of configuration parameters and a plurality of coefficients. The correspondence between a plurality of groups of configuration parameters and a plurality of coefficients may be defined in a protocol, or may be indicated by the network device to the terminal device in advance. This is not limited in this application. The reference threshold may be predefined, for example, defined in a protocol, or may be indicated by the network device to the terminal device. This is not limited in this application.

The coefficient may be related to the CSI process feature, the feedback bandwidth, the quantity of pieces of fed-back CSI, or the codebook parameter.

For example, it is assumed that when a type of the feedback bandwidth is a wideband, a corresponding threshold is a reference threshold (for example, denoted as $X_1$). In this case, when a type of the feedback bandwidth is a sub-band, a corresponding threshold may be determined based on the reference threshold and a coefficient corresponding to the feedback bandwidth. For example, the coefficient corresponding to the feedback bandwidth may be a ratio of the wideband to the sub-band. For example, if a ratio of a bandwidth for a wideband feedback to a bandwidth for a sub-band feedback is 5, a coefficient that corresponds when a type of the feedback bandwidth is a sub-band may be 5. Further, it may be learned that, the threshold that corresponds when a type of the feedback bandwidth is sub-band is a product (that is, $5X_1$) of the reference threshold and the coefficient.

For another example, it is assumed that a threshold that corresponds when the quantity of pieces of fed-back CSI is 1 is a reference threshold (for example, denoted as $X_2$). In this case, a threshold corresponding to feeding back a plurality of pieces of CSI may be determined based on the reference threshold and a coefficient corresponding to feeding back the plurality of pieces of CSI. For example, a coefficient that corresponds when a plurality of pieces of CSI are fed back may be a ratio of a quantity of pieces of fed-back CSI to 1. For example, if a quantity of pieces of fed-back CSI is 2, a corresponding coefficient is 2. Further, it may be learned that, a threshold for feeding back a plurality of pieces of CSI is a product (that is, $2X_2$) of the reference threshold and the coefficient.

For still another example, it is assumed that a threshold that corresponds when a beam quantity in the codebook parameter is 2 is a reference threshold (for example, denoted as $X_3$). In this case, a threshold that corresponds when the beam quantity in the codebook parameter is another value may be determined based on the reference threshold and a coefficient corresponding to the beam quantity. For example, a coefficient that corresponds when the beam quantity in the codebook parameter is 4 may be a ratio of beam quantities. For example, if a beam quantity is 4, a corresponding coefficient is 2. Further, it may be learned that, a threshold when the beam quantity is 4 is a product (that is, $2X_3$) of the reference threshold and the coefficient.

For yet another example, it is assumed that a threshold that corresponds when the CSI process feature is that FeCoMP CSI is unable is a reference threshold (for example, denoted as X4). In this case, a threshold that corresponds when the CSI process feature is that the FeCoMP CSI is enabled may be determined based on the reference threshold and a coefficient corresponding to that the FeCoMP CSI is enabled. For example, a coefficient corresponding to that the FeCoMP CSI is enabled is 2. Further, it may be learned that, a threshold that corresponds when that the FeCoMP CSI is enabled is fed back is a product (that is, $2X_4$) of the reference threshold and the coefficient.

The foregoing describes in detail the correspondences between the configuration parameters and the coefficients with reference to a plurality of examples, but this should not constitute any limitation on this application. For example, the correspondences between the configuration parameters and the coefficients may further include a correspondence between antenna port quantities and coefficients. The following describes correspondences between the configuration parameters and the thresholds with reference to specific configuration parameters. For brevity, the correspondences between the configuration parameters and the thresholds are not enumerated one by one herein.

It should be further understood that, the foregoing enumerates several methods for determining the threshold corresponding to the configuration parameter. However, this may provide only several possible implementations, but should not constitute any limitation on this application. In this application, it is not excluded that another method is used to determine the threshold corresponding to the configuration parameter.

In step 230, the terminal device sends only uplink control information on the physical uplink channel if a relationship between a resource on the physical uplink channel and the threshold meet a first preset condition.

Correspondingly, in step 230, if the relationship between the resource on the physical uplink channel and the threshold meets the first preset condition, the network device receives only the uplink control information on the physical uplink channel.

Based on a relationship between the resource that is on the physical uplink channel and that is allocated to the terminal device and the threshold, the terminal device may determine whether to send only the uplink control information on the physical uplink channel.

For ease of description, it is assumed that the resource on the physical uplink channel occupies P (P>0) resource units, the threshold is X (X>0), and X and P have a same dimension, for example, a quantity of symbols, a quantity of RBs, or a quantity of REs. In this case, the first preset condition may include:

(a) P<X;
(b) P≤X;
(c) P≤X±T, where T is a predefined value or is indicated by the network device;
(d) P<X/2; or
(e) P<2X.

In other words, when the relationship between the resource on the physical uplink channel and the threshold meets any one of the foregoing (a) to (e), it may be considered that the relationship between the resource on the physical uplink channel and the threshold meets the first preset condition. The first preset condition may be specifically which one of (a) to (e) may be agreed on by the network device and the terminal device in advance, for example, defined in a protocol, or determined by the network device and then notified by the network device to the terminal device. This is not limited in this application.

T may be understood as a tolerance value, and a value of T may be related to a resource configuration (for example, a frame structure parameter numerology). The frame structure parameter may include, for example, at least one of a subcarrier spacing and a cyclic shift CP. For example, when the subcarrier spacing is 15 kHz, T may be one RB. When the subcarrier spacing is 30 kHz, T may be two RBs. A correspondence between values of T and resource configurations may be predefined, for example, defined in a protocol. The network device and the terminal device may determine a corresponding T value based on a current resource configuration. It should be understood that, the foregoing enumerated values of T are merely examples for description, and shall not constitute any limitation on this application. In this embodiment of this application, T may alternatively be a predefined fixed value, for example, be defined in a protocol, or determined by the network device and indicated by the network device to the terminal device.

It should be further understood that, a quantity of thresholds is not limited in this application either. For example, there may be a plurality of, for example, two, thresholds corresponding to the configuration parameter. When a quantity of thresholds changes, specific content of the first preset condition may also change. A description is provided with reference to a specific example below.

For ease of description, it is assumed that the resource on the physical uplink channel occupies $P_1$ ($P_1$>0) first resource units and $P_2$ second resource units. When thresholds are $Y_1$ first resource units and $Y_2$ second resource units ($Y_1$>0, $Y_2$>0), for example, the first resource unit is a symbol, and the second resource unit is an RB, the first preset condition may include:

(a') $P_1<Y_1$, and $P_2<Y_2$;
(b') $P_1 \leq Y_1$, and $P_2 \leq Y_2$;
(c') $P_1 \leq Y_1 \pm T_1$, and $P_2 \leq Y_2 \pm T_2$, where $T_1$ is a predefined value or is indicated by the network device, and $T_2$ is a predefined value or is indicated by the network device;
(d') $P_1<Y_1/2$, and $P_2<Y_2/2$; or
(e') $P_1<2Y_1$, and $P_2<2Y_2$.

In other words, when the relationship between the resource on the physical uplink channel and the threshold meets any one of the foregoing (a') to (e'), it may be considered that the relationship between the resource on the physical uplink channel and the threshold meets the first preset condition. The first preset condition is specifically which one of (a') to (e') may be agreed on by the network device and the terminal device in advance, for example, defined in a protocol, or determined by the network device and then notified by the network device to the terminal device. This is not limited in this application.

$Y_1$ and $T_1$ have a same dimension as $P_1$, and $Y_2$ and $T_2$ have a same dimension as $P_2$. Both $Y_1$ and $Y_2$ may be determined based on the configuration parameter. Both $T_1$ and $T_2$ may be understood as tolerance values, and values of $Y_1$, $Y_2$, $T_1$, and $T_2$ may be related to the resource configuration (for example, the frame structure parameter numerology). Specific content of the frame structure parameter has been described above. For brevity, details are not described herein again.

Optionally, the threshold may be a specific value, or may be a value range. This is not limited in this application.

It should be understood that, the several pieces of possible specific content of the first preset condition that are enumerated above are merely examples for description, and shall not constitute any limitation on this application.

In this embodiment of this application, if the relationship between the resource on the physical uplink channel and the threshold meets the first preset condition, the terminal device may send only the uplink control information but not send uplink data on the physical uplink channel. In other words, when the relationship between the resource on the physical uplink channel and the threshold meets the first preset condition, sending uplink data on the physical uplink channel is forbidden.

It should be noted that, "the terminal device sends only uplink control information on the physical uplink channel" described herein is relative to sending of the uplink data. In other words, for the uplink data and the uplink control information, the terminal device sends only the uplink control information but does not send the uplink data. Therefore, "the terminal device sends only uplink control information on the physical uplink channel" does not mean that the terminal device does not send another signal, for example, a reference signal, on the physical uplink channel. A person skilled in the art may understand a meaning thereof.

Optionally, the method 200 further includes step 240: If the relationship between the resource on the physical uplink channel and the threshold does not meet the first preset condition, the terminal device sends the uplink control information and the uplink data on the physical uplink channel.

Correspondingly, in step 240, if the relationship between the resource on the physical uplink channel and the threshold does not meet the first preset condition, the network device receives the uplink control information and the uplink data on the physical uplink channel.

Specifically, if the relationship between the resource on the physical uplink channel and the threshold does not meet the first preset condition, the terminal device may send the uplink control information and the uplink data on the physical uplink channel. In other words, when the relationship between the resource on the physical uplink channel and the threshold does not meet the first preset condition, a specific signal sent by the terminal device on the physical uplink channel is not limited.

That the relationship between the resource on the physical uplink channel and the threshold does not meet the first preset condition may include specifically: The relationship between the resource on the physical uplink channel and the threshold does not meet any one of (a) to (e) enumerated above, or the relationship between the resource on the physical uplink channel and the threshold does not meet any one of (a') to (e') enumerated above. Specifically, the first preset condition used by the network device and the terminal device in step 230 is the same as the first preset condition used in step 240. To be specific, the network device and the terminal device use (a) in the foregoing enumerations as the first preset condition in step 230, the network device and the terminal device also use (a) as the first preset condition in step 240, and so on.

It should be noted that, the uplink control information may be periodically or discretely sent in time domain. At a moment, if the terminal device needs to send uplink control information, the terminal device may send a scheduling request to the network device in advance, to request the network device to allocate a resource. The network device may allocate the resource to the terminal device, so that the terminal device sends a physical uplink channel on the allocated resource. For example, the terminal device may determine, according to the method provided in this application, whether to send only uplink control information on the physical uplink channel. Only the uplink control information is sent when the relationship between the resource on the physical uplink channel and the threshold meets the first preset condition; and the uplink control information and data are sent when the relationship between the resource on the physical uplink channel and the threshold does not meet the first preset condition. However, in this application, a possibility that only the uplink control information is sent on the physical uplink channel when the relationship between the resource on the physical uplink channel and the threshold meets the first preset condition is not excluded, and a possibility that only the uplink data is sent on the physical uplink channel when the relationship between the resource on the physical uplink channel and the threshold does not meet the first preset condition is not excluded either.

For example, at another moment, if the relationship between the resource on the physical uplink channel and the threshold does not meet the first preset condition, for example, resources on the physical uplink channel are relatively sufficient, for example, P>X, but there is no uplink data to be sent currently, the terminal device may send only the uplink control information on the physical uplink channel. However, this does not mean that the physical uplink channel is used to send only the uplink control information.

For another example, at still another moment, if the terminal device does not need to send uplink control information, the terminal device may alternatively send only uplink data on the physical uplink channel. In this case, the terminal device may directly send the uplink data on the physical uplink channel, and does not need to determine in advance whether the relationship between the resource on the physical uplink channel and the threshold meets the first preset condition. In other words, if the terminal device sends only the uplink data on the physical uplink channel, whether the relationship between the resource on the physical uplink channel and the threshold meets the first preset condition is irrelevant.

Optionally, the method 200 further includes step 250: The terminal device determines whether the relationship between the resource on the physical uplink channel and the threshold meets the first preset condition.

Correspondingly, the method 200 further includes step 260: The network device determines whether the relationship between the resource on the physical uplink channel and the threshold meets the first preset condition.

The terminal device and the network device may separately determine, based on the configuration parameter of the terminal device, whether any item of the first preset condition is met, and correspondingly perform the action in step 230 or step 240 when the first preset condition is met or not met.

Based on the foregoing technical solution, the network device and the terminal device may separately determine the threshold based on the configuration parameter, and may further determine, based on the relationship between the resource on the physical uplink channel and the threshold, whether to transmit only uplink control information on the physical uplink channel. Therefore, the network device can correctly receive the uplink control information, and this helps improve data transmission reliability. In addition, when the resource on the physical uplink channel is sufficient, the terminal device may further send the uplink control information and uplink data in parallel on the physical uplink channel. This improves resource utilization, and does not affect correct receiving of the uplink control information. On the whole, this helps improve transmission performance of a communications system.

It should be understood that, merely for ease of understanding, the foregoing describes in detail, by using interaction between the network device and the terminal device as an example, the communication method provided in this embodiment of this application. However, this should not constitute any limitation on this application. For example, the network device that sends the information about the configuration parameter to the terminal device and the network device that receives the uplink control information may be a same network device or different network devices. This is not limited in this application.

It should be further understood that, FIG. 2 schematically shows, merely for ease of understanding, the steps performed by the terminal device and the network device. However, this does not mean that the terminal device and network device perform each step shown in the figure. For example, the terminal device may perform either step 230 or step 240 based on a relationship between the resource on the physical uplink channel allocated to the terminal device and the threshold.

The following describes in detail the correspondences between the configuration parameters and the thresholds with reference to specific examples.

As described above, the threshold may be greater than or equal to the minimum resource used to transmit the uplink control information. Therefore, the minimum resource for transmitting the uplink control information may be determined based on the configuration parameter, and further the threshold is determined based on the minimum resource for transmitting the uplink control information.

It should be noted that, when the threshold corresponding to the configuration parameter is determined, although the threshold may correspond to only one or more parameters in the configuration parameter, a process of calculating a value of the threshold may still involve the foregoing enumerated parameters. The threshold corresponding to the configuration parameter of the terminal device in this application may be understood as a maximum value of feedback overheads required when another parameter changes randomly, or in other words, various possible cases of the another parameter are traversed, on the premise that the configuration parameter of the terminal device is fixed, to be specific, on the premise that one or more of the foregoing enumerated CSI process feature, feedback feature, codebook feature, and resource feature that is of the physical uplink channel are fixed. In this way, it can be ensured that feedback overheads required when others parameter are set to any value fall within a range of the threshold, and there is a sufficient resource to send the uplink control information.

For example, if the configuration parameter indicates that the CSI process feature is that FeCoMP is enabled, a maximum value of feedback overheads required when another parameter changes randomly may be considered. For example, when a rank is greater than 1, two pieces of CSI are fed back, and when a feedback mode is a mode 3-2, feedback overheads required are the largest, a resource corresponding to the feedback overheads is the minimum resource required for sending uplink control information, and a threshold obtained in this way is also a threshold that corresponds when the configuration parameter indicates that the CSI process feature is that the FeCoMP is enabled.

In other words, determining the threshold based on one or more parameters in the configuration parameter does not mean that another parameter is not considered. Instead, the corresponding threshold is determined by using the one or more parameters in the configuration parameter as independent variables and enabling various possible cases of the another parameter to be traversed.

For ease of description and understanding, the following describes the correspondences between the thresholds and the configuration parameters with reference to different configuration parameters by using parameter values defined in an existing LTE protocol and an existing NR protocol as an example. However, this should not constitute any limitation on this application. In a future protocol, if parameters enumerated in the following embodiments are newly defined, the value of the threshold may still be determined based on a same concept.

It should be noted that, in the following embodiments, a process of calculating the threshold based on the configuration parameter is shown. However, this shows only a possible implementation of calculating the threshold, and should not constitute any limitation on this application. A threshold calculation method is not particularly limited in this embodiment of this application.

In the following embodiments shown, the threshold may be calculated based on the configuration parameter, a modulation mode, the feature of the resource occupied by the physical uplink channel, a minimum code rate, and the like. For example, it is assumed that the threshold is expressed as a quantity of RBs. In this case, a value of the threshold may be obtained in at least any one of the following manners:

(1) The value of the threshold is greater than or equal to the minimum resource for transmitting the uplink control information, and the minimum resource (for example, a resource unit is an RB) for transmitting the uplink control information meets:

Minimum resource for transmitting the uplink control information=quantity of bits for transmitting the uplink control information/quantity of REs in each RB on the physical uplink channel/quantity of bits carried in each symbol/minimum code rate required for transmitting the uplink control information.

(2) The value of threshold may meet:

Threshold=quantity of bits for transmitting the uplink control information/quantity of REs in each RB on the physical uplink channel/quantity of bits carried by each symbol/minimum code rate required for transmitting the uplink control information.

Optionally, the threshold may be a smallest positive integer greater than or equal to the foregoing value, that is, rounding up.

The minimum resource required for transmitting the uplink control information may be determined by using bit overheads required for a feedback and a quantity of bits required for a cyclic redundancy check (Cyclic Redundancy Check, CRC) code. The following describes, with reference to a specific example, the bit overheads required for a feedback, and the quantity of the bits required for the CRC code may be determined based on a definition in an existing protocol (for example, the LTE protocol or the NR protocol) or a future protocol. The feature of the resource occupied by the physical uplink channel and the minimum code rate may be determined based on the definition in the existing protocol or the future protocol. A quantity of bits carried in each symbol is related to the modulation mode. For example, when the modulation mode is quadrature phase shift keying (Quadrature Phase Shift Keying, QPSK), each symbol may carry 2-bit information. When the modulation mode is 16 quadrature amplitude modulation (Quadrature Amplitude Modulation, QAM), each symbol may carry 4-bit information. When the modulation scheme is 64QAM, each symbol may carry 6-bit information. When the modulation scheme is 256QAM, each symbol may carry 8-bit information.

For ease of description, it is assumed that the modulation mode may be QPSK. In this case, Each symbol may carry 2-bit information. The quantity of bits required for the CRC code may be 8. It is assumed that the physical uplink channel may be a PUSCH. In LTE, a minimum quantity of REs on each RB on the PUSCH is: 12*(12−4−2−1)=60, where 12 represents that there are 12 subcarriers on one RB, and (12−4−2−1) represents a quantity of symbols that can be used to transmit the uplink control information and that are on one RB. For (12−4−2−1), 12 is a quantity of symbols included in one subframe in a case of an extended cyclic prefix (cyclic prefix, CP), 4 is a quantity of symbols occupied by an ACK/NACK, 2 is a quantity of symbols occupied by a DMRS, and 1 is a quantity of symbols occupied by an SRS. In NR, it is assumed that when the uplink control information is carried, a minimum quantity of remaining available symbols other than symbols that may be occupied by a DMRS, an ACK/NACK, and an SRS on the PUSCH may be 4. In this case, a minimum quantity of REs on each RB on the PUSCH may be: 12*4=48. The minimum code rate (code rate) may be 0.188.

It should be understood that, the foregoing enumerated parameters, for example, the modulation mode, the quantity of bits of the CRC code, the minimum code rate, the quantity of the subcarriers included in the RB, the quantity of the symbols, and the like may be predefined, or may be configured by the network device by using signaling. This is not limited in this application.

How to determine the threshold is described below by using an example with reference to different configuration parameters. It should be understood that, the following enumerated correspondences between the configuration parameters and the thresholds are determined based on definitions of feedback overheads in the existing LTE protocol and the existing NR protocol. However, this application does not exclude a possibility of defining a new configuration parameter or modifying an existing configuration parameter, for example, the CSI process feature, the feedback feature, or the codebook feature, in a future protocol. However, it may be understood that, any method for determining, based on a same concept, the threshold corresponding to the configuration parameter should fall within the protection scope of this application.

In the following embodiments, the threshold may be a quantity of resource units in time domain, a quantity of resource units in frequency domain, or a quantity of resource units in time-frequency domain, for example, may be a quantity of RBs, a quantity of symbols, or a quantity of REs. This is not limited in this application.

1. CSI Process Feature

Optionally, if the CSI process feature is that FeCoMP CSI is enabled, the threshold may be eight RBs, nine RBs, or ten RBs.

When the CSI process feature is that the FeCoMP CSI is enabled, a maximum value of bit overheads required for feeding back CSI by the terminal device is determined as the minimum resource for transmitting the uplink control information. The threshold may be a value greater than or equal to the minimum resource for transmitting the uplink control information.

When the CSI process feature is that the FeCoMP CSI is enabled, and a rank is greater than 1, the terminal device may send a maximum of two codewords and may feed back a maximum of two pieces of CSI each time. In addition, when the feedback mode is the mode 3-2, the most information is fed back, and bit overheads required for a feedback are the largest. A definition that the feedback overheads have when a rank is 2 in Table 5.2.2.6.2-2D-1 that is based on LTE protocol Release 14 (Release 14, R14) is used as an example:

Bits required for a CQI feedback are: 2*(4 bits+2 bits*13)=60 bits, where 2 represents that a maximum of two codewords are sent each time, 4 bits is wideband CQI feedback overheads, and 2 bits*13 is sub-band CQI feedback overheads; for 2 bits*13, 2 bits is CQI feedback overheads of each sub-band, and 13 is a quantity of sub-bands.

Bits required for a PMI feedback are: 2*(4 bits+4 bits*13)=112 bits, where 2 represents that a maximum of two codewords are sent each time, 4 bits is wideband PMI feedback overheads, and 4 bits*13 is sub-band PMI feedback overheads; for 4 bits*13, 4 bits is PMI feedback overheads of each sub-band, and 13 is a quantity of sub-bands.

Bits required for a CRI feedback are 2 bits, and the CRI may be 0, 1, or 2.

Bits required for an RI feedback are 4 bits. When the CRI is 2, two RIs are fed back, and the RI does not exceed 4.

Therefore, it may be learned that, bits required for a CSI feedback are: 60 bits+112 bits+2 bits+4 bits+8 bits=186 bits. If the minimum quantity 60 of the REs on each RB on the PUSCH in LTE is still used, it may be learned that, the minimum resource required for transmitting the uplink control information is: 186/60/2/0.188=8.24 RBs, that is, nine RBs.

Optionally, if the CSI process feature is that FeCoMP CSI is enabled, the threshold may be $M_1$ RBs, where $M_1$ may be a positive integer greater than or equal to 9. For example, $M_1$ may be 9 or 10.

In view of that in the future protocol, the minimum code rate may be adjusted, and a feedback type, for example, a layer indication (layer indication, LI), may be added, the minimum resource required for transmitting the uplink control information may float upward or downward.

In conclusion, it may be learned that, when the CSI process feature is that the FeCoMP CSI is enabled, the threshold may be eight RBs, nine RBs, or 10 RBs.

Optionally, if the CSI process feature is that FeCoMP CSI is unable, the threshold may be four RBs, five RBs, six RBs, or seven RBs.

When the CSI process feature is that the FeCoMP CSI is unable, a maximum value of overheads required for feeding back CSI by the terminal device is determined as the minimum resource for transmitting the uplink control information. The threshold may be the value greater than or equal to the minimum resource for transmitting the uplink control information.

When the CSI process feature is that the FeCoMP CSI is unable, and a rank is greater than 1, the terminal device may send a maximum of two codewords and the terminal device feeds back only one piece of CSI each time. In addition, when the feedback mode is the mode 3-2, the most information is fed back, and bit overheads required for a feedback are the largest. A definition that the feedback overheads have when a rank is 2 in Table 5.2.2.6.2-2D-1 in LTE protocol Release 14 (Release 14, R14) is used as an example:

Bits required for a CQI feedback are: 2*(4 bits+2 bits*13) =60 bits, where 2 represents that a maximum of two codewords are sent each time, 4 bits is wideband CQI feedback overheads, and 2 bits*13 is sub-band CQI feedback overheads; for 2 bits*13, 2 bits is CQI feedback overheads of each sub-band, and 13 is a quantity of sub-bands.

Bits required for a PMI feedback are: 4 bits+4 bits*13=56 bits, where 4 bits is wideband PMI feedback overheads, and 4 bits*13 is sub-band PMI feedback overheads; for 4 bits*13, 4 bits is PMI feedback overheads of each sub-band, and 13 is a quantity of sub-bands.

Bits required for a CRI feedback are 2 bits, and CRI may be 0 or 1.

Bits required for an RI feedback are 3 bits. When CRI is 0 or 1, one RI is fed back, and the RI does not exceed 8.

Therefore, it may be learned that, bits required for a CSI feedback are: 60 bits+56 bits+2 bits+3 bits+8 bits=129 bits. Therefore, it may be learned that, the minimum resource required for transmitting the uplink control information is: 129/60/2/0.188=5.72 RBs, that is, six RBs.

Optionally, if the CSI process feature is that the FeCoMP CSI is unable, the threshold may be $M_2$ RBs, where $M_2$ may be a positive integer greater than or equal to 6. For example, $M_2$ may be 6 or 7.

In view of that in the future protocol, the minimum code rate may be adjusted, and a feedback type, for example, an LI, may be added, the minimum resource required for transmitting the uplink control information may float upward or downward.

In conclusion, it may be learned that, when the CSI process feature is that the FeCoMP CSI is unable, the threshold may be four RBs, five RBs, six RBs, or seven RBs.

2. Feedback Feature

In LTE, the feedback feature may be indicated by using the feedback mode. A correspondence between feedback modes and specific feedback content may be shown in the following table.

| | | PMI feedback type (PMI Feedback Type) | | |
|---|---|---|---|---|
| | | Feed back no PMI (No PMI) | Feed back one PMI (Single PMI) | Feed back a plurality of PMIs (Multiple PMIs) |
| PUSCH CQI feedback type (PUSCH CQI Feedback Type) | Wideband (wideband CQI) (wideband CQI) | Mode 1-0 | Mode 1-1 | Mode 1-2 |
| | UE Selected (sub-band CQI) (UE Selected (sub-band CQI)) | Mode 2-0 | | Mode 2-2 |
| | Higher layer-configured (sub-band CQI) higher layer-configured (subband CQI) | Mode 3-0 | Mode 3-1 | Mode 3-2 |

It can be learned from the foregoing table that, compared with feedback overheads corresponding to the feedback mode when the feedback mode is the mode 2-0, the mode 1-0, or the mode 1-1, feedback overheads corresponding to the feedback mode when the feedback mode is the mode 3-1, the mode 1-2, the mode 3-0, the mode 2-2, or the mode 3-2 are more than feedback overheads corresponding to another feedback mode. Therefore, the feedback modes may be divided into two groups. A first group may include the mode 2-0, the mode 1-0, or the mode 1-1. A second group may include the mode 3-1, the mode 1-2, the mode 3-0, the mode 2-2, and the mode 3-2. Thresholds corresponding to the two groups of feedback modes are respectively maximum values of feedback overheads required by the groups.

In LTE, the network device may indicate a feedback mode to the terminal device, to trigger the terminal device to perform measurement and a feedback based on the feedback mode. There is a correspondence between feedback modes and specific feedback content.

It should be understood that, the feedback modes enumerated above are merely examples for description, and shall not constitute any limitation on this application. It should be further understood that, the correspondence between the feedback modes enumerated above and the specific feedback content is merely an example for description, and shall not constitute any limitation on this application. This application does not exclude a possibility of defining a feedback mode that has another name in an existing or future protocol to replace the foregoing enumerated feedback modes, and does not exclude a possibility of adding a new feedback mode in a future protocol either. Names and a quantity of feedback modes are not limited in this application. In addition, this application does not exclude a possibility of indicating specific feedback content in another manner in the future protocol either.

In other words, the feedback feature may be indicated by using the feedback mode, or may be indicated in another manner. For example, in NR, the specific feedback content may be indicated by using a measurement configuration. Details are described below with reference to the measurement configuration in NR.

Optionally, if the feedback mode is any one of the mode 2-0, the mode 1-0, or the mode 1-1, the threshold is two RBs, three RBs, or four RBs.

In the mode 2-0, the mode 1-0, or the mode 1-1, feedback overheads in the mode 2-0 is the largest, and therefore the minimum resource for transmitting the uplink control information may be determined in the mode 2-0. In addition, when the CSI process feature is that the FeCoMP CSI is enabled, a rank is greater than 1, and CRI=2, the most information is fed back, and bit overheads required for a feedback are the largest. A definition that the feedback overheads have when a rank is greater than 1 in Table 5.2.2.6.3-1B-1 in LTE protocol R14 is used as an example:

Bits required for a CQI feedback are: 2*(4 bits+2 bits)=12 bits, where 2 represents that a maximum of two codewords are sent each time, 4 bits is wideband CQI feedback overheads, and 2 bits is sub-band CQI feedback overheads.

Bits required for feed backing a location of a UE selected sub-band are 4 bits. A bit overheads required for the feedback may be related to a quantity of UE selected sub-bands.

Therefore, it may be learned that, bits required for a CSI feedback are: 12 bits+4 bits+8 bits=24 bits. Therefore, it may be learned that, the minimum resource required for transmitting the uplink control information is: 24/60/2/0.188=1.06 RBs, that is, two RBs.

Optionally, if the feedback mode is any one of the mode 2-0, the mode 1-0, or the mode 1-1, the threshold may be $M_3$ RBs, where $M_3$ may be a positive integer greater than or equal to 2. For example, $M_3$ may be 2, 3, or 4.

In view of that in the future protocol, the minimum code rate may be adjusted, and a feedback type, for example, an LI, may be added, the minimum resource required for transmitting the uplink control information may float upward or downward.

In conclusion, when the feedback mode is any one of the mode 2-0, the mode 1-0, or the mode 1-1, the threshold may be two RBs, three RBs, or four RBs.

Optionally, if the feedback mode is any one of the mode 3-1, the mode 1-2, the mode 3-0, the mode 2-2, and the mode 3-2, the threshold is eight RBs, nine RBs, or 10 RBs.

Among the mode 3-1, the mode 1-2, the mode 3-0, the mode 2-2, and the mode 3-2, the most information is fed back and bit overheads required for a feedback are the largest in the mode 3-2. Therefore, the minimum resource for transmitting the uplink control information may be determined in the mode 3-2. In addition, when the CSI process feature is that the FeCoMP CSI is enabled, a rank is greater than 1, and CRI=2, the most information is fed back.

The specific process of determining, in the mode 3-2, the minimum resource for transmitting the uplink control information is described in detail above with reference to the configuration parameter, namely, the CSI process feature. For brevity, details are not described herein again.

In NR, the feedback feature may be indicated by using a reporting setting carried in an RRC message, and the feedback feature may include one or more of the feedback type, the quantity of pieces of fed-back CSI, and the feedback bandwidth.

Optionally, if the feedback feature is the wideband feedback, the threshold is seven RBs, eight RBs, or nine RBs.

When a type of the feedback bandwidth is a wideband, the codebook type is a type II codebook, and a rank is 2 or 3, a larger amount of information is fed back, and bit overheads required for a feedback are larger. Therefore, the minimum resource for transmitting the uplink control information during a wideband feedback may be determined based on this. A definition that the feedback overheads have when the rank is 2 in the NR protocol is used as an example:

Bits required for a CRI feedback are 3 bits, which is related to a quantity of configured CSI-RS resources.

Bits required for an RI feedback are 3 bits.

Bits required for a CQI feedback are 7 bits.

Bits required for a PMI feedback are 105 bits.

Therefore, it may be learned that, bits required for a CSI feedback are: 3 bits+3 bits+7 bits+105 bits+8 bits=126 bits. If the minimum quantity 48 of the REs on each RB on the PUSCH in NR is still used, it may be learned that, the minimum resource required for transmitting the uplink control information is: 126/48/2/0.188=6.98 RBs, that is, seven RBs.

Optionally, if the type of the feedback bandwidth is the wideband, the threshold may be $M_4$ RBs, where $M_4$ may be a positive integer greater than or equal to 7. For example, $M_4$ may be 7, 8, or 9.

In view of that in the future protocol, the minimum code rate may be adjusted, and a feedback type, for example, an LI, may be added, the minimum resource required for transmitting the uplink control information may float upward or downward.

In conclusion, when the type of the feedback bandwidth is the wideband, the threshold may be seven RBs, eight RBs, or nine RBs.

Optionally, if the feedback feature is a sub-band feedback, the threshold is 30 RBs, 35 RBs, or 40 RBs.

When a type of the feedback bandwidth is a wideband and a sub-band, the codebook type is a type II codebook, and a rank is 2 or 3, a larger amount of feedback information is fed back, and bit overheads required for a feedback are larger. Therefore, the minimum resource for transmitting the uplink control information during a wideband feedback may be determined based on this. A definition that the feedback overheads have when the rank is 2 in the NR protocol is used as an example:

Bits required for a CRI feedback are 3 bits.

Bits required for an RI feedback are 3 bits.

Bits required for a CQI feedback are: 4 bits+2 bits*10=24 bits, where 4 bits is feedback overheads of a wideband CQI, and 2 bits*10 is feedback overheads of a sub-band CQI. For 2 bits*10, 2 bits is feedback overheads of each sub-band CQI, and 10 is a quantity of sub-bands.

Bits required for a PMI feedback are 543 bits.

Therefore, it may be learned that, bits required for a CSI feedback are: 3 bits+3 bits+543 bits+24 bits=581 bits. Therefore, it may be learned that, the minimum resource required for transmitting the uplink control information is: 581/48/2/0.188=32.2 RBs, that is, 33 RBs.

Optionally, if the feedback feature is the sub-band feedback, the threshold may be $M_5$ RBs, where $M_5$ may be a positive integer greater than or equal to 33. For example, $M_5$ may be 33 or 35.

In view of that in the future protocol, the minimum code rate may be adjusted, and a feedback type, for example, an LI, may be added, the minimum resource required for transmitting the uplink control information may float upward or downward.

In conclusion, it may be learned that, when the type of the feedback bandwidth is the sub-band, the threshold may be 30 RBs, 35 RBs, or 40 RBs.

With reference to the correspondence between the configuration parameters and the coefficients that is described above, a coefficient that corresponds when a type of the feedback bandwidth is the sub-band is 5. This can also exactly match the foregoing threshold directly determined based on the configuration parameter.

Optionally, if the feedback type is feeding back no PMI and a type of the feedback bandwidth is the wideband, the threshold is one RB.

When the feedback type is feeding back no PMI and a type of the feedback bandwidth is the wideband, and a rank is 2, a larger amount of information is fed back, and bit overheads required for a feedback are larger. Therefore, the minimum resource for transmitting the uplink control information during a wideband feedback may be determined based on this. A definition that the feedback overheads have when the rank is 2 in the LTE protocol is used as an example:

Bits required for an RI feedback are 2 bits.

Bits required for a CQI feedback are: 4 bits*2=8 bits.

Therefore, it may be learned that, bits required for a CSI feedback are: 2 bits+8 bits+8 bits=18 bits. Therefore, it may be learned that, the minimum resource required for transmitting the uplink control information is: 18/60/2/0.188=0.8 RBs, that is, one RB.

Optionally, if the feedback type is feeding back no PMI and the type of the feedback bandwidth is the wideband, the threshold may be $M_6$ RBs, where $M_6$ may be a positive integer greater than or equal to 1. For example, $M_6$ may be 1.

In view of that in the future protocol, the minimum code rate may be adjusted, and a feedback type, for example, an LI, may be added, the minimum resource required for transmitting the uplink control information may float upward or downward.

In conclusion, it may be learned that, when the feedback type is feeding back no PMI and the type of the feedback bandwidth is the wideband, the threshold may be one RB.

Optionally, if the quantity of pieces of fed-back CSI is 1, the threshold is 30 RBs, 32 RBs, or 34 RBs.

When the quantity of pieces of fed-back CSI is 1, it is equivalent to that CRI=0 or 1. In NR, when a codebook type is a type II codebook, a rank is 2, and a type of the feedback bandwidth is the sub-band, the most information is fed back. The PUSCH occupies at least four symbols. Therefore, when a quantity of symbols is 4, a quantity of RBs required for a feedback is the largest.

A definition that the feedback overheads have when the codebook type is the type II codebook and the rank is 2 in NR is used as an example:

Bits required for a CQI feedback are: (4 bits+2 bits*10) =24 bits, where 4 bits is wideband CQI feedback overheads, and 2 bits*10 is sub-band CQI feedback overheads; for 2 bits*10, 2 bits is CQI feedback overheads of each sub-band, and 10 is a quantity of sub-bands.

Bits required for a PMI feedback are 543 bits.

Therefore, it may be learned that, bits required for a CSI feedback are: 24 bits+543 bits+8 bits=575 bits. Therefore, it may be learned that, the minimum resource required for transmitting the uplink control information is: 575/48/2/0.188=31.86 RB, that is, 32 RBs.

Optionally, if the codebook type is the type II codebook, the threshold may be $M_7$ RBs, and $M_7$ may be a positive integer greater than or equal to 32. For example, $M_7$ may be 32 or 34.

In view of that in the future protocol, the minimum code rate may be adjusted, and a feedback type, for example, an LI, may be added, the minimum resource required for transmitting the uplink control information may float upward or downward.

In conclusion, when the codebook type is the type II codebook, the threshold may be 30 RBs, 32 RBs, or 34 RBs.

Further, the threshold that corresponds when the quantity of pieces of fed-back CSI is 1 may be used as a reference threshold. When the type of the feedback bandwidth is further defined as a wideband, a threshold that corresponds when the quantity of pieces of fed-back CSI is 1 and a type of the feedback bandwidth is the wideband may be determined based on a coefficient of a wideband feedback. For example, the coefficient may be a ratio of a bandwidth for a wideband feedback to a bandwidth for a sub-band feedback.

For example, it is assumed that the threshold that corresponds when the quantity of pieces of fed-back CSI is 1 is $M_7$ RBs. In this case, if the ratio of the bandwidth for a wideband feedback to the bandwidth for a sub-band feedback is r, it may be learned that, the threshold that corresponds when the quantity of pieces of fed-back CSI is 1 and a type of the feedback bandwidth is the wideband is $\lceil M_7/r \rceil$.

Optionally, if the quantity of pieces of fed-back CSI is 1, the threshold is nine RBs. When the quantity of pieces of fed-back CSI is 1, it is equivalent to that CRI=0 or 1. In LTE, that CRI=0 or 1 may correspond to a case in which the CSI process feature is that the FeCoMP CSI is unable. Based on the configuration parameter, when the feedback mode is 3-2, the most information is fed back, and overheads required for a feedback are the largest.

The specific process of determining, based on the configuration parameter, namely, the CSI process feature that is that the FeCoMP CSI is unable, the minimum resource for transmitting the uplink control information is described in detail above with reference to the configuration parameter, namely, the CSI process feature. For brevity, details are not described herein again.

Further, when a plurality of pieces of CSI are fed back, the threshold that corresponds when the quantity of pieces of fed-back CSI is 1 may be used as a reference threshold to determine a threshold that corresponds when the plurality of pieces of CSI are fed back. For example, it is assumed that the threshold that corresponds when the quantity of pieces of fed-back CSI is 1 is $M_7$ RBs. In this case, when a quantity of pieces of fed-back CSI is k, a corresponding threshold is $k*M_7$ RBs.

3. Codebook Feature (A) Codebook Type

In NR, the codebook type may include, for example, a four-antenna (4T) codebook, an eight-antenna (8T) codebook, an enhanced 4T codebook, a class A (Class A) codebook, a class B (Class B) codebook, an enhanced (Advanced) codebook, a non-enhanced codebook, a type I (Type I) single panel (single panel, SP) codebook, a type I (Type I) multiple panel (multiple panel, MP) codebook, a type II (Type II) codebook, and a type II port selection codebook.

A threshold corresponding to the codebook type may be greater than or equal to the minimum resource for transmitting the uplink control information, and the minimum resource for transmitting the uplink control information may be a maximum value of feedback overheads that is determined when the codebook type is fixed and that various possible cases of another parameter are traversed is considered. In this way, it can be ensured that there is a sufficient resource to send the uplink control information when the codebook type is fixed and the another parameter changes randomly.

(1) Type I Codebook

Optionally, if the codebook type is the type I codebook, the threshold is five RBs, six RBs, seven RBs, or eight RBs.

When the codebook type is the type I codebook, a maximum value of overheads required for feeding back CSI by the terminal device is determined as the minimum resource for transmitting the uplink control information, and the threshold may be greater than or equal to the value of the minimum resource for transmitting the uplink control information.

When the codebook type is the type I codebook, a rank is 1, and a type of the feedback bandwidth is a sub-band, the most information is fed back. In NR, the PUSCH occupies at least four symbols. Therefore, when the quantity of the symbols is 4, a quantity of RBs required for a feedback is the largest.

A definition that the feedback overheads have when the codebook type is the type I codebook and a rank is 1 in NR is used as an example:

Bits required for a CQI feedback are: 4 bits+2 bits*10=24 bits, where 4 bits is wideband CQI feedback overheads, and 2 bits*10 is sub-band CQI feedback overheads; for 2 bits*10, 2 bits is CQI feedback overheads of each sub-band, and 10 is a quantity of sub-bands.

Bits required for a PMI feedback are 46 bits.

Therefore, it may be learned that, bits required for a CSI feedback are: 24 bits+46 bits+8 bits=78 bits. Therefore, it may be learned that, the minimum resource required for transmitting the uplink control information is: 78/48/2/0.188=4.32 RBs, that is, five RBs.

Optionally, if the codebook type is the type I codebook, the threshold may be $M_8$ RBs, where $M_8$ may be a positive integer greater than or equal to 5. For example, $M_8$ may be 5, 6, 7, or 8.

In view of that in the future protocol, the minimum code rate may be adjusted, and a feedback type, for example, an LI, may be added, the minimum resource required for transmitting the uplink control information may float upward or downward.

In conclusion, when the codebook type is the type I codebook, the threshold may be five RBs, six RBs, seven RBs, or eight RBs.

If a value of a rank in the codebook type is further limited, a corresponding threshold may be further obtained.

Optionally, if the codebook type is the type I codebook, and the rank is 5, the threshold is six RBs, seven RBs, or eight RBs.

When the codebook type is the type I codebook and the rank is 5, and a type of the feedback bandwidth is a sub-band, the most information is fed back. In NR, the PUSCH occupies at least four symbols. Therefore, when the quantity of the symbols is 4, a quantity of RBs required for a feedback is the largest.

A definition that the feedback overheads have when the codebook type is the type I codebook and a rank is 5 in NR is used as an example:

Bits required for a CQI feedback are: 2*(4 bits+2 bits*10)=48 bits, where 2 represents that a maximum of two codewords are sent each time, 4 bits is wideband CQI feedback overheads, and 2 bits*10 is sub-band CQI feedback overheads; for 2 bits*10, 2 bits is CQI feedback overheads of each sub-band, and 10 is a quantity of sub-bands.

Bits required for a PMI feedback are 18 bits.

Therefore, it may be learned that, bits required for a CSI feedback are: 48 bits+18 bits+8 bits=102 bits. Therefore, it may be learned that, the minimum resource required for transmitting the uplink control information is: 102/48/2/0.188=4.1 RBs, that is, five RBs.

Optionally, if the codebook type is the type I codebook and the rank is 5, the threshold may be $M_9$ RBs, where $M_9$ may be a positive integer greater than or equal to 5. For example, $M_9$ may be 5, 6, or 7.

In view of that in the future protocol, the minimum code rate may be adjusted, and a feedback type, for example, an LI, may be added, the minimum resource required for transmitting the uplink control information may float upward or downward.

In conclusion, when the codebook type is the type I codebook, the threshold may be five RBs, six RBs, or seven RBs.

(2) Type II Codebook

Optionally, if the codebook type is the type II codebook, the threshold is 30 RBs, 32 RBs, or 34 RBs.

When the codebook type is the type II codebook, a maximum value of overheads required for feeding back CSI by the terminal device is determined as the minimum resource for transmitting the uplink control information, and the threshold may be greater than or equal to the value of the minimum resource for transmitting the uplink control information.

When the codebook type is the type II codebook, in a current technology, a rank is less than 5, and regardless of whether the rank is 1, the terminal device may send a maximum of one codeword each time. When the rank is 2 or 3 and a type of the feedback bandwidth is a sub-band, a larger amount of information is fed back. In NR, the PUSCH occupies at least four symbols. Therefore, when a quantity of symbols is 4, a quantity of RBs required for a feedback is the largest.

The specific process of determining, based on the configuration parameter, namely, the type II codebook, the minimum resource for transmitting the uplink control information is described in detail above with reference to the configuration parameter, namely, the type II codebook. For brevity, details are not described herein again.

(3) Enhanced Codebook

Optionally, if the codebook type is an enhanced codebook, the threshold is 11 RBs or 12 RBs.

When the codebook type is the enhanced codebook, a maximum value of overheads required for feeding back CSI by the terminal device is determined as the minimum resource for transmitting the uplink control information, and the threshold may be greater than or equal to the value of the minimum resource for transmitting the uplink control information.

When the codebook type is the enhanced codebook, and the CSI process feature is that FeCoMP CSI is enabled and the rank is greater than 1, the terminal device may send a maximum of two codewords and may feed back a maximum of two pieces of CSI each time. In addition, overheads required for feeding back CSI based on the class A codebook are the largest. A definition that the feedback overheads have when the rank is 2 in Table 5.2.2.6.2-2E-6 in LTE protocol R14 as an example:

It is assumed that a quantity of antenna ports is 8, where an antenna port quantity $N_1$ in a horizontal polarization direction is 2, an antenna port quantity $N_2$ in a vertical polarization direction is 2, an oversampling factor $O_1$ in the horizontal polarization direction is 2, an oversampling factor $O_2$ in the vertical polarization direction is 4, and a beam quantity $L_1$ in the horizontal polarization direction is 2, and a beam quantity $L_2$ in the vertical polarization direction is 2.

A quantity of bits required for a CQI feedback is: 4+2N+4+2N, that is, 2*(4 bits+2 bits*13)=60 bits, where 2 represents that a maximum of two codewords are sent each time, 4 bits is wideband CQI feedback overheads, and 2 bits*13 is sub-band CQI feedback overheads; for 2 bits*13, 2 bits is CQI feedback overheads of each sub-band, and 13 is a quantity of sub-bands.

A quantity of bits required for a PMI feedback is $\lceil \log_2(N_1O_1) \rceil + \lceil \log_2(N_2O_2) \rceil + \lceil \log_2 L_1 \rceil + \lceil \log_2 L_2 \rceil + 2 + 12N$, that is, 3 bits+3 bits+1 bit+1 bit+2 bits+12 bits*13=165 bits.

Therefore, it may be learned that, bits required for a CSI feedback are: 60 bits+165 bits+8 bits=233 bits.

If the minimum quantity 60 of the REs on each RB on the PUSCH in LTE is still used, it may be learned that, the minimum resource required for transmitting the uplink control information is: 233/60/2/0.188=10.3 RBs, that is, 11 RBs.

If the codebook type is the enhanced codebook, the threshold may be $M_{10}$ RBs, where $M_{10}$ may be a positive integer greater than or equal to 11. For example, $M_{10}$ may be 11 or 12.

In view of that in the future protocol, the minimum code rate may be adjusted, and a feedback type, for example, an LI, may be added, the minimum resource required for transmitting the uplink control information may float upward or downward.

In conclusion, when the codebook type is the enhanced codebook, the threshold is 11 RBs or 12 RBs.

(4) Non-Enhanced Codebook

Optionally, if the codebook type is the non-enhanced codebook, the threshold is four RBs or five RBs.

When the codebook type is the enhanced codebook, and the CSI process feature is that FeCoMP CSI is enabled and the rank is greater than 1, the terminal device may send a maximum of two codewords and may feed back a maximum of two pieces of CSI each time. In addition, overheads required for feeding back CSI based on the class B codebook are the largest. A definition that the feedback overheads have when the rank is 2 in Table 5.2.2.6.2-2A-1 in LTE protocol R14 as an example:

Bits required for a CQI feedback are: 2*(4 bits+2 bits*13) =60 bits, where 2 represents that a maximum of two codewords are sent each time, 4 bits is wideband CQI feedback overheads, and 2 bits*13 is sub-band CQI feedback overheads; for 2 bits*13, 2 bits is CQI feedback overheads of each sub-band, and 13 is a quantity of sub-bands.

Bits are required for a PMI feedback are: 4 bits*4=16 bits.

Therefore, it may be learned that, bits required for a CSI feedback are: 60 bits+16 bits+8 bits=84 bits. Therefore, it may be learned that, the minimum resource required for transmitting the uplink control information is: 84/60/2/0.188=3.72 RBs, that is, four RBs.

If the codebook type is the non-enhanced codebook, the threshold may be $M_{11}$ RBs, where $M_{11}$ may be a positive integer greater than or equal to 4. For example, $M_{11}$ may be 4 or 5.

In view of that in the future protocol, the minimum code rate may be adjusted, and a feedback type, for example, an LI, may be added, the minimum resource required for transmitting the uplink control information may float upward or downward.

In conclusion, when the codebook type is the non-enhanced codebook, the threshold is four RBs or five RBs.

(B) Codebook Parameter

The codebook parameter may include, for example, antenna port quantities in different polarization directions (for example, including an antenna port quantity $N_1$ in a horizontal polarization direction and an antenna port quantity $N_2$ in a vertical polarization direction), oversampling factors in the different polarization directions (for example, an oversampling factor $O_1$ in the horizontal polarization direction and an oversampling factor $O_2$ in the vertical polarization direction), beam quantities in the different polarization directions (for example, a beam quantity $L_1$ in the horizontal polarization direction and a beam quantity $L_2$ in the vertical polarization direction), and a codebook subset configuration.

It should be noted that, a relationship between the antenna port quantity N and the antenna port quantities $N_1$ and $N_2$ in different polarization directions may meet: $N=2N_1N_2$.

A threshold corresponding to the codebook parameter may be greater than or equal to the minimum resource for transmitting the uplink control information, and the minimum resource for transmitting the uplink control information may be a maximum value of feedback overheads that is determined when one or more parameters in the codebook parameter is fixed and that various possible cases of another parameter are traversed is considered. In this way, it can be ensured that there is a sufficient resource to send the uplink control information when the codebook parameter is fixed and another parameter changes randomly.

Optionally, if a beam quantity in the codebook parameter is 4, the threshold is 25 RBs, 30 RBs, 32 RBs, 35 RBs, or 40 RBs.

When a beam quantity L (where L≥1, and L is an integer) in the codebook parameter is 4, a maximum value of overheads required for feeding back CSI by the terminal device is determined as the minimum resource for transmitting the uplink control information, and the threshold may be greater than or equal to the value of the minimum resource for transmitting the uplink control information.

When the beam quantity L in the codebook parameter is 4, the codebook type is the type II codebook, and a type of the feedback bandwidth is the wideband and the sub-band, the most information is fed back. In NR, the PUSCH occupies at least four symbols. Therefore, when the quantity of the symbols is 4, a quantity of RBs required for a feedback is the largest. A definition that feedback overheads have when the codebook type is the type II codebook, a rank is 2, L=4 in NR is used as an example:

Bits required for a CQI feedback are: 4 bits+2 bits*10=24 bits, where 4 bits is wideband CQI feedback overheads, and 2 bits*10 is sub-band CQI feedback overheads: for 2 bits*10, 2 bits is CQI feedback overheads of each sub-band, and 10 is a quantity of sub-bands.

Bits required for a PMI feedback are 543 bits.

Therefore, it may be learned that, bits required for a CSI feedback are: 24 bits+543 bits+8 bits=575 bits. Therefore, it may be learned that, the minimum resource required for transmitting the uplink control information is: 575/48/2/0.188=31.86 RBs, that is, 32 RBs.

Optionally, if the beam quantity in the codebook parameter is 4, the threshold may be $M_{12}$ RBs, where $M_{12}$ may be a positive integer greater than or equal to 32. For example, $M_{12}$ may be 32 or 34.

In view of that in the future protocol, the minimum code rate may be adjusted, and a feedback type, for example, an LI, may be added, the minimum resource required for transmitting the uplink control information may float upward or downward.

In conclusion, when the beam quantity L in the codebook parameter is 4, the threshold may be 25 RBs, 30 RBs, 32 RBs, 35 RBs, or 40 RBs.

Optionally, if a beam quantity in the codebook parameter is 2, the threshold is 15 RBs, 17 RBs, or 20 RBs.

When a beam quantity L in the codebook parameter is 2, a maximum value of overheads required for feeding back CSI by the terminal device is determined as the minimum resource for transmitting the uplink control information, and the threshold may be greater than or equal to the value of the minimum resource for transmitting the uplink control information.

When the beam quantity L in the codebook parameter is 2, the codebook type is the type II codebook, and a type of the feedback bandwidth is the wideband and the sub-band, the most information is fed back. In NR, the PUSCH occupies at least four symbols. Therefore, when the quantity of the symbols is 4, a quantity of RBs required for a feedback is the largest. A definition that feedback overheads have when the codebook type is the type II codebook, a rank is 2, L=4 in NR is used as an example:

Bits required for a CQI feedback are: 4 bits+2 bits*10=24 bits, where 4 bits is wideband CQI feedback overheads, and 2 bits*10 is sub-band CQI feedback overheads: for 2 bits*10, 2 bits is CQI feedback overheads of each sub-band, and 10 is a quantity of sub-bands.

Bits required for a PMI feedback are 273 bits.

Therefore, it may be learned that, bits required for a CSI feedback are: 24 bits+273 bits+8 bits=305 bits. Therefore, it may be learned that, the minimum resource required for transmitting the uplink control information is: 305/48/2/0.188=16.9 RBs, that is, 17 RBs.

Optionally, if the beam quantity in the codebook parameter is 2, the threshold may be $M_{13}$ RBs, where $M_{13}$ may be a positive integer greater than or equal to 17. For example, $M_{13}$ may be 17 or 20.

In view of that in the future protocol, the minimum code rate may be adjusted, and a feedback type, for example, an LI, may be added, the minimum resource required for transmitting the uplink control information may float upward or downward.

In conclusion, it may be learned that, when the beam quantity L in the codebook parameter is 2, the threshold may be 15 RBs, 17 RBs, or 20 RBs.

With reference to the correspondence between the configuration parameters and the coefficients that is described above, a coefficient corresponding the beam quantity 4 is 2. This can also exactly match the foregoing threshold directly determined based on the configuration parameter.

(C) Codebook Type and Codebook Parameter

Optionally, if the codebook type is the enhanced codebook, the antenna port quantity N in the codebook parameter is 32, $(N_1, N_2, O_1, O_2)=(8, 2, 4, 4)$, $L_1=4$, $L_2=2$, codebook configuration (codebook config)=1, and a rank is 1, the threshold is six RBs.

It should be noted that, the codebook configuration is used to indicate a beam selection rule. For example, different beam selection rules may be indicated by using four bits. For a beam selection rule, refer to descriptions in the prior art. For brevity, details are not described herein again.

When the codebook type is the enhanced codebook, the antenna port quantity N is 32, $(N_1, N_2, O_1, O_2)=(8,2, 4, 4)$, $L_1=4$, $L_2=2$, codebook configuration (codebook config)=1, and a rank is 1, feedback overheads that are based on the class A codebook are the largest. A definition of the feedback overheads in Table 5.2.2.6.2-2E-6 that is based on LTE protocol R14 is used as an example:

A quantity of bits required for a CQI feedback is 4+2N, where N represents a quantity of sub-bands. In the LTE protocol, N may be 13. That is, 4 bits+2 bits*13=30 bits.

A quantity of bits required for a PMI feedback is $\lceil \log_2(N_1O_1)\rceil+\lceil \log_2(N_2O_2)\rceil+\lceil \log_2L_1\rceil+\lceil \log_2L_2\rceil+2+6N$, that is, 5 bits+3 bits+2 bits+1 bit+2 bits+6 bits*13=91 bits.

Therefore, it may be learned that, bits required for a CSI feedback are: 30 bits+91 bits+8 bits=129 bits.

If the minimum quantity 60 of the REs on each RB on the PUSCH in LTE is still used, it may be learned that, the minimum resource required for transmitting the uplink control information is: 128/60/2/0.188=5.72 RBs, that is, six RBs.

Optionally, if the codebook type is the class A codebook in the enhanced codebook, the antenna port quantity in the codebook parameter is 32, $(N_1, N_2, O_1, O_2)=(8, 2, 4, 4)$, $L_1=4$, $L_2=2$, a codebook configuration is 1, and a rank is 1, the threshold is $M_{14}$ RBs, where $M_{14}$ may be a positive integer greater than or equal to 6. For example, $M_{14}$ may be 6.

In view of that in the future protocol, the minimum code rate may be adjusted, and a feedback type, for example, an LI, may be added, the minimum resource required for transmitting the uplink control information may float upward or downward.

In conclusion, it may be learned that, when the codebook type is the enhanced codebook, the antenna port quantity in the codebook parameter is 32, $(N_1, N_2, O_1, O_2)=(8, 2, 4, 4)$, $L_1=4$, $L_2=2$, codebook configuration=1, and the rank is 1, the threshold may be six RBs.

Optionally, if the codebook type is the class A codebook in the enhanced codebook, the antenna port quantity in the codebook parameter is 32, $(N_1, N_2, O_1, O_2)=(8, 2, 4, 4)$, $L_1=4$, $L_2=2$, a codebook configuration is 1, and a rank is 2, the threshold is 11 RBs.

When the codebook type is the enhanced codebook, the antenna port quantity N is 32, $(N_1, N_2, O_1, O_2)=(8, 2, 4, 4)$, $L_1=4$, $L_2=2$, a codebook configuration is 1, and a rank is 2, feedback overheads that are based on the class A codebook are the largest. A definition of the feedback overheads in Table 5.2.2.6.2-2E-6 that is based on LTE protocol R14 is used as an example:

A quantity of bits required for a CQI feedback is 4+2N+4+2N, where N represents a quantity of sub-bands. In the LTE protocol, N may be 13. That is, 2*(4 bits+2 bits*3)=60 bits.

A quantity of bits required for a PMI feedback is $\lceil \log_2(N_1O_1)\rceil+\lceil \log_2(N_2O_2)\rceil+\lceil \log_2L_1\rceil+\lceil \log_2L_2\rceil+2+12N$, that is, 5 bits+3 bits+2 bits+1 bit+2 bits+12 bits*13=169 bits.

Therefore, it may be learned that, bits required for a CSI feedback are: 60 bits+169 bits+8 bits=129 bits.

If the minimum quantity 60 of the REs on each RB on the PUSCH in LTE is still used, it may be learned that, the minimum resource required for transmitting the uplink control information is: 129/60/2/0.188=10.51 RBs, that is, 11 RBs.

Optionally, if the codebook type is the class A codebook in the enhanced codebook, the antenna port quantity in the codebook parameter is 32, $(N_1, N_2, O_1, O_2)=(8, 2, 4, 4)$, $L_1=4$, $L_2=2$, a codebook configuration is 1, and a rank is 2, the threshold is $M_{15}$ RBs, where $M_{15}$ may be a positive integer greater than or equal to 11. For example, $M_{15}$ may be 11 or 12.

In view of that in the future protocol, the minimum code rate may be adjusted, and a feedback type, for example, an LI, may be added, the minimum resource required for transmitting the uplink control information may float upward or downward.

In conclusion, it may be learned that, when the codebook type is the enhanced codebook, the antenna port quantity in the codebook parameter is 32, $(N_1, N_2, O_1, O_2)=(8, 2, 4, 4)$, $L_1=4$, $L_2=2$, codebook configuration=1, and the rank is 2, the threshold may be 11 RBs or 12 RBs.

Optionally, if the codebook type is the enhanced codebook, an enhanced MIMO type (eMIMO type) is a class A, the antenna port quantity in the codebook parameter is 8, $(N_1, N_2, O_1, O_2)=(2, 2, 4, 4)$, $L_1=2$, $L_2=2$, a codebook configuration is 1, and a rank is 2, the threshold is 11 RBs or 12 RBs.

When the codebook type is the enhanced codebook, the antenna port quantity N is 8, $(N_1, N_2, O_1, O_2)=(2, 2, 4, 4)$, $L_1=2$, $L_2=2$, a codebook configuration is 1, and a rank is 2, feedback overheads that are based on the class A codebook are the largest. A definition of the feedback overheads in Table 5.2.2.6.2-2E-6 that is based on LTE protocol R14 is used as an example:

A quantity of bits required for a CQI feedback is 4+2N+4+2N, where N represents a quantity of sub-bands. In the LTE protocol, N may be 13. That is, 2*(4 bits+2 bits*3)=60 bits.

A quantity of bits required for a PMI feedback is $\lceil \log_2(N_1O_1)\rceil+\lceil \log_2(N_2O_2)\rceil+\lceil \log_2L_1\rceil+\lceil \log_2L_2\rceil+2+12N$, that is, 3 bits+3 bits+1 bit+1 bit+2 bits+12 bits*13=166 bits.

Therefore, it may be learned that, bits required for a CSI feedback are: 60 bits+166 bits+8 bits=234 bits.

If the minimum quantity 60 of the REs on each RB on the PUSCH in LTE is still used, it may be learned that, the minimum resource required for transmitting the uplink control information is: 234/60/2/0.188=10.37 RBs, that is, 11 RBs.

Optionally, if the codebook type is the enhanced codebook, the antenna port quantity N is 8, $(N_1, N_2, O_1, O_2)$=(2, 2, 4, 4), $L_1$=2, $L_2$=2, a codebook configuration is 1, and a rank is 2, the threshold may be $M_{16}$ RBs, where $M_{16}$ may be a positive integer greater than or equal to 11. For example, $M_{16}$ may be 11 or 12.

In view of that in the future protocol, the minimum code rate may be adjusted, and a feedback type, for example, an LI, may be added, the minimum resource required for transmitting the uplink control information may float upward or downward.

In conclusion, it may be learned that, when the codebook type is the class A codebook in the enhanced codebook, the antenna port quantity in the codebook parameter is 8, $(N_1, N_2, O_1, O_2)$=(8, 2, 4, 4), $L_1$=2, $L_2$=2, codebook configuration is 1, and the rank is 2, the threshold may include 11 RBs or 12 RBs.

Optionally, if the codebook type is the enhanced codebook, the antenna port quantity in the codebook parameter is 8, $(N_1, N_2, O_1, O_2)$=(2, 2, 4, 4), $L_1$=2, $L_2$=2, codebook configuration=1, and a rank is 2, the threshold may include 11 RBs.

A definition of the feedback overheads in Table 5.2.2.5.2-2E-5 in the LTE protocol is used as an example:

A quantity of bits required for a CQI feedback is 4+2N+4+2N, where N represents a quantity of sub-bands. In the LTE protocol, N may be 13. That is, 2*(4 bits+2 bits*13)=60 bits.

A quantity of bits required for a PMI feedback is $\lceil \log_2(N_1 O_1) \rceil$+0+$\log_2 L_1$+0+2+12N. That is, 3 bits+0 bits+1 bit+0 bits+2 bits+12 bits*13=162 bits.

Therefore, it may be learned that, bits required for a CSI feedback are: 60 bits+162 bits+8 bits=240 bits.

If the minimum quantity 60 of the REs on each RB on the PUSCH in LTE is still used, it may be learned that, the minimum resource required for transmitting the uplink control information is: 240/60/2/0.188=10.2 RBs, that is, 11 RBs.

Optionally, if the codebook type is the 8-antenna (8T) codebook, the antenna port quantity N is 8, $(N_1, N_2, O_1, O_2)$=(2, 2, 4, 4), $L_1$=2, $L_2$=2, a codebook configuration is 1, and a rank is 2, the threshold may be $M_{17}$ RBs, where $M_{17}$ may be a positive integer greater than or equal to 11. For example, $M_{17}$ may be 11 or 12.

In view of that in the future protocol, the minimum code rate may be adjusted, and a feedback type, for example, an LI, may be added, the minimum resource required for transmitting the uplink control information may float upward or downward.

In conclusion, it may be learned that, when the codebook type is the enhanced codebook, the antenna port quantity in the codebook parameter is 8, $(N_1, N_2, O_1, O_2)$=(2, 2, 4, 4), $L_1$=4, $L_2$=2, codebook configuration=1, and the rank is 2, the threshold may be 11 RBs or 12 RBs.

4. Resource Feature of the Physical Uplink Channel

Based on the foregoing description of determining the threshold corresponding to the codebook type, the specific process of calculating the threshold has been described in detail. When the resource feature of the physical uplink channel is further considered, thresholds that correspond when a quantity of symbols occupied by the physical uplink channel is 4 to 13 may be considered.

Optionally, if the codebook type in the codebook feature is the type I codebook, and the quantity of the symbols occupied by the physical uplink channel is 4 to 13, the corresponding thresholds are shown in the following table:

| Quantity of symbols | Threshold (RB) |
| --- | --- |
| 4 | 6 |
| 5 | 5 |
| 6 | 4 |
| 7 | 4 |
| 8 | 3 |
| 9 | 3 |
| 10 | 3 |
| 11 | 3 |
| 12 | 2 |
| 13 | 2 |

Optionally, if the codebook type in the codebook feature is the type II codebook, and the quantity of the symbols occupied by the physical uplink channel is 4 to 13, the corresponding thresholds are shown in the following table:

| Quantity of symbols | Threshold (RB) |
| --- | --- |
| 4 | 34 |
| 5 | 27 |
| 6 | 23 |
| 7 | 19 |
| 8 | 17 |
| 9 | 15 |
| 10 | 14 |
| 11 | 13 |
| 12 | 12 |
| 13 | 11 |

5. CSI Process Feature and Codebook Feature

The plurality of configuration parameters enumerated above may alternatively be used in combination to determine the corresponding threshold. That is, when a plurality of parameters in the configuration parameters are fixed, and various possible cases of another parameter are traversed, the maximum value of bit overheads required for a CSI feedback is calculated, and further the minimum resource required for transmitting the uplink control information is determined. The threshold may be greater than or equal to a value of the minimum resource required for transmitting the uplink control information.

Optionally, if the CSI process feature is that the FeCoMP CSI is enabled, and the codebook type is the enhanced (Enhanced) codebook, the threshold is 11 RBs or 12 RBs.

When the CSI process feature is that the FeCoMP CSI is enabled, and the codebook type is the enhanced codebook, a maximum value of bit overheads required for a CSI feedback when various possible cases of another parameter are traversed may be considered to be the minimum resource for transmitting the uplink control information. The threshold may be a value greater than or equal to the minimum resource for transmitting the uplink control information.

When the CSI process feature is that the FeCoMP CSI is enabled, the codebook type is the enhanced codebook, and the rank is greater than 1, the terminal device may send a maximum of two codewords and may feed back a maximum of two pieces of CSI each time. In addition, overheads required for feeding back CSI when the code type is the class A (Class A) are the largest.

The specific process of determining, when the CSI process feature is that the FeCoMP CSI is enabled and the codebook type is the enhanced codebook, the minimum resource for transmitting the uplink control information is described in detail above with reference to a case in which the codebook type is the enhanced codebook. For brevity, details are not described herein again.

Optionally, if the CSI process feature is that the FeCoMP CSI is enabled, and the codebook type is the non-enhanced codebook, the threshold is four RBs or five RBs.

When the CSI process feature is that the FeCoMP CSI is enabled, the codebook type is the non-enhanced codebook, and the rank is greater than 1, the terminal device may send a maximum of two codewords and may feed back a maximum of two pieces of CSI each time. In addition, overheads required for feeding back CSI when a CRI is 2 and the rank is greater than 1 are the largest.

The specific process of determining, when the CSI process feature is that the FeCoMP CSI is enabled and the codebook type is the non-enhanced codebook, the minimum resource for transmitting the uplink control information is described in detail above with reference to a case in which the codebook type is the non-enhanced codebook. For brevity, details are not described herein again.

6. Codebook Feature and Feedback Feature

Optionally, if the codebook type is the type II codebook, the rank is 2, L in the codebook parameter is 2, $(N_1, N_2)=(4, 4)$, and the feedback type is a wideband feedback and a sub-band feedback, the threshold is 17 RBs.

A definition that feedback overheads have when the codebook type is the type II codebook, a rank is 2, L=2, $(N_1, N_2)=(4, 4)$, and the feedback type is a wideband feedback and a sub-band feedback in NR is used as an example:

Bits required for a CQI feedback are: 4 bits+2 bits*10=24 bits, where 4 bits is wideband CQI feedback overheads, and 2 bits*10 is sub-band CQI feedback overheads; for 2 bits*10, 2 bits is CQI feedback overheads of each sub-band, and 10 represents a quantity of sub-bands.

Bits required for a PMI feedback are 273 bits.

Therefore, it may be learned that, bits required for a CSI feedback are: 273 bits+24 bits+8 bits=305 bits.

Therefore, it may be learned that, the minimum resource required for transmitting the uplink control information is: 305/48/2/0.188=16.9 RBs, that is, 17 RBs.

Optionally, if the codebook type is the type II codebook, the rank is 2, L in the codebook parameter is 2, $(N_1, N_2)=(4, 4)$, and the feedback type is a wideband feedback and a sub-band feedback, the threshold is $M_{18}$ RBs, where $M_{18}$ may be a positive integer greater than or equal to 11. For example, $M_{18}$ may be 17.

In view of that in the future protocol, the minimum code rate may be adjusted, and a feedback type, for example, an LI, may be added, the minimum resource required for transmitting the uplink control information may float upward or downward.

In conclusion, it may be learned that, when the codebook type is the type II codebook, the rank is 2, L in the codebook parameter is 2, $(N_1, N_2)=(4, 4)$, and the feedback type is the wideband feedback and the sub-band feedback, the threshold is 17 RBs.

Optionally, if the codebook type is the type II codebook, the rank is 2. L in the codebook parameter is 2, $(N_1, N_2)=(2, 1)$, and the feedback type is a wideband feedback and a sub-band feedback, the threshold is 17 RBs.

A definition that feedback overheads have when the codebook type is the type II codebook, a rank is 2, L=2, $(N_1, N_2)=(2, 1)$, and the feedback type is a wideband feedback and a sub-band feedback in NR is used as an example:

Bits required for a CQI feedback are: 4 bits+2 bits*10=24 bits, where 4 bits is wideband CQI feedback overheads, and 2 bits*10 is sub-band CQI feedback overheads; for 2 bits*10, 2 bits is CQI feedback overheads of each sub-band, and 10 represents a quantity of sub-bands.

Bits required for a PMI feedback are 264 bits.

Therefore, it may be learned that, bits required for a CSI feedback are: 264 bits+24 bits+8 bits=296 bits.

Therefore, it may be learned that, the minimum resource required for transmitting the uplink control information is: 296/48/2/0.188=16.4 RBs, that is, 17 RBs.

If the codebook type is the type II codebook, the rank is 2, L in the codebook parameter is 2, $(N_1, N_2)=(2, 1)$, and the feedback type is a wideband feedback and a sub-band feedback, the threshold is $M_{19}$ RBs, where $M_{19}$ may be a positive integer greater than or equal to 17. For example, $M_{19}$ may be 17.

In view of that in the future protocol, the minimum code rate may be adjusted, and a feedback type, for example, an LI, may be added, the minimum resource required for transmitting the uplink control information may float upward or downward.

In conclusion, it may be learned that, when the codebook type is the type II codebook, the rank is 2, L in the codebook parameter is 2, $(N_1, N_2)=(2, 1)$, and the feedback type is the wideband feedback and the sub-band feedback, the threshold is 17 RBs.

The foregoing enumerates the correspondences between the configuration parameters and the thresholds by using a quantity of RBs as an example, but this should not constitute any limitation on this application. The following separately uses examples for descriptions of that the threshold is used as a quantity of time-domain resource units and a quantity of frequency-domain resource units.

If the threshold is a quantity of symbols, a value of the threshold may be obtained in at least any one of the following manners:

(1) The value of the threshold is greater than or equal to the minimum resource for transmitting the uplink control information, and the minimum resource (for example, a resource unit is a symbol) for transmitting the uplink control information meets:

Minimum resource for transmitting the uplink control information=quantity of bits for transmitting the uplink control information (quantity of subcarriers in one RB*quantity of RBs)/quantity of bits carried in each symbol/minimum code rate required for transmitting the uplink control information.

(2) The value of threshold may meet:

Threshold=quantity of bits for transmitting the uplink control information (quantity of subcarriers in one RB*quantity of RBs)/quantity of bits carried in each symbol/minimum code rate required for transmitting the uplink control information.

For example, each RB includes 12 subcarriers. It is assumed that a modulation mode is QPSK, to be specific, each symbol may carry two-bit information. It is assumed that the minimum code rate may be 0.188. It is assumed that a quantity of bits required by the CRC code may be 8. Optionally, if the codebook type is the type I codebook, a type of the feedback bandwidth is the sub-band, the rank is 2, and a quantity of RBs occupied by the physical uplink channel, for example, a PUSCH, is 10, the threshold is two symbols.

When the codebook type is the type I codebook, a type of the feedback bandwidth is a sub-band, and the rank is 2, bits required for a CSI feedback are 78 bits. The 78 bits include specifically 24 bits required for a CQI feedback, 46 bits required for a PMI feedback, and 8 bits required for CRC code. Bit overheads required for a CSI feedback are described in detail above with reference to a threshold corresponding to the type I codebook. For brevity, details are not described herein again.

When the quantity of the RBs occupied by the PUSCH is 10, it may be learned that, the minimum quantity of symbols required for transmitting the uplink control information is 78 bits/(2 bits/RE)/(12*10 RBs)/0.188=1.73 symbols, that is, two symbols.

Optionally, if the codebook type is the type I codebook, a type of the feedback bandwidth is the sub-band, the rank is 2, and a quantity of RBs occupied by the physical uplink channel, for example, a PUSCH, is 8, the threshold is three symbols.

When the quantity of RBs occupied by the PUSCH is 8, the minimum quantity of REs required for transmitting the uplink control information may be: 78 bits/(2 bits/RE)/(12*8 RBs)/0.188=2.16 symbols, that is, 3 symbols.

Optionally, if the codebook type is the type I codebook, a type of the feedback bandwidth is the sub-band, and the rank is 2, the threshold is $K_1$ symbols, where $K_1$ may be a positive integer greater than or equal to 2. For example, $K_1$ is 2 or 3.

In view of that in the future protocol, the minimum code rate may be adjusted, and a feedback type, for example, an LI, may be added, the minimum resource required for transmitting the uplink control information may float upward or downward.

In conclusion, it may be learned that, when the codebook type is the type I codebook, the type of the feedback bandwidth is the sub-band, and the rank is 2, the threshold may be two symbols or three symbols.

In other words, when a relationship between a quantity of symbols on the physical uplink channel and the threshold meets the first preset condition, only the uplink control information may be sent on the resource on the physical uplink channel. When the relationship between the quantity of the symbols occupied by the physical uplink channel and the threshold does not meet the first preset condition, the uplink control information and the data may be sent on the resource on the physical uplink channel.

The first preset condition may be similar to (a) to (e) enumerated above, and dimensions of both the resource on the physical uplink channel and the threshold are symbols. For brevity, details are not described herein again.

(a) in the first preset condition enumerated above is used as an example. If the network device configures that a quantity of symbols in one slot is less than or equal to 2, the terminal device may send only the uplink control information on the physical uplink channel. If the network device configures that a quantity of symbols in one slot is greater than 2, the terminal device may send the uplink control information and the uplink data on the physical uplink channel.

It should be understood that, the foregoing merely uses an example in which the threshold is a quantity of symbols for description, and this should not constitute any limitation on this application. The threshold is not limited to the quantity of symbols, and for example, may further include a quantity of RBs and a quantity of symbols. A corresponding first preset condition may be any one of (a') to (e') enumerated above. The first resource unit may be a symbol, and the second resource unit may be an RB. That is, the quantity of symbols and the quantity of RBs are used in combination as the first preset condition.

(a') in the first preset condition enumerated above is used as an example. If the network device configures that a quantity of symbols in one slot is less than or equal to 2, and a quantity that is of RBs occupied by the physical uplink channel and that is configured by the network device is less than or equal to 5 (refer to the threshold corresponding to the type I codebook above), the terminal device may send only the uplink control information on the physical uplink channel. If the network device configures that a quantity of symbols in one slot is greater than 2, or the network device configures that a quantity of RBs on the physical uplink channel is greater than 5, the terminal device may send the uplink control information and the uplink data on the physical uplink channel.

It should be noted that, the quantity of symbols described above is a quantity of symbols that remain in a subframe after sending of a DMRS, an ACK/NACK, and an SRS is considered.

If the threshold is a quantity of REs, a value of the threshold may be obtained in at least any one of the following manners:

(1) The value of the threshold is greater than or equal to the minimum resource for transmitting the uplink control information, and the minimum resource (for example, a resource unit is an RE) for transmitting the uplink control information meets:

Minimum resource for transmitting the uplink control information=quantity of bits for transmitting the uplink control information/quantity of bits carried in each symbol/minimum code rate required for transmitting the uplink control information.

(2) The value of threshold may meet:

Threshold=quality of bits for transmitting the uplink control information/quality of bits carried by each symbol/minimum code rate required for transmitting the uplink control information.

For example, it is assumed that each RB includes 12 subcarriers. It is assumed that a modulation mode is QPSK, to be specific, each symbol may carry two-bit information. It is assumed that the minimum code rate may be 0.188. It is assumed that a quantity of bits required by the CRC code may be 8.

If the codebook type is the type I codebook, a type of the feedback bandwidth is the sub-band, the rank is 2, and the physical uplink channel, for example, a PUSCH, occupies eight RBs, the threshold is three REs.

When the codebook type is the type I codebook, a type of the feedback bandwidth is the sub-band, the rank is 2, and the quantity of RBs occupied by the physical uplink channel is 8, the quantity of bits required for a CSI feedback is 78. The 78 bits include specifically 24 bits required for a CQI feedback, 46 bits required for a PMI feedback, and 8 bits required for CRC code. Bit overheads required for a CSI feedback are described in detail above with reference to a threshold corresponding to the type I codebook. For brevity, details are not described herein again.

When the codebook type is the type I codebook, a type of the feedback bandwidth is the sub-band, the rank is 2, and the quantity of RBs occupied by the physical uplink channel is 8, it may be learned that, the minimum quantity of REs required for transmitting the uplink control information is: 78 bits/(2 bits/RE)/0.188=207.45 REs, that is, 208 REs.

The first preset condition may be similar to (a) to (e) enumerated above, and dimensions of both the resource on the physical uplink channel and the threshold are REs. For brevity, details are not described herein again.

A possible configuration parameter of the network device that is defined in a current protocol is used as an example. When a pilot on the physical uplink channel is not considered, a correspondence that is between a quantity of symbols, a quantity of RBs, and a quantity of REs on the physical uplink channel and that is configured by the network device is shown in the following table.

| Quantity of symbols occupied by a physical uplink channel | Quantity of RBs occupied by the physical uplink channel | Quantity of REs configured for the physical uplink channel |
|---|---|---|
| 14 | 1 | 14*1*12 = 168 |
| 7 | 3 | 7*3*12 = 252 |
| 4 | 2 | 4*2*12 = 96 |

Compared with the threshold 208 obtained through calculation, when the quantity of the REs configured for the physical uplink channel is 168, because 168<208, the terminal device sends only the uplink control information on the physical uplink channel. When the quantity of the REs configured for the physical uplink channel is 252, because 252>208, the terminal device may send the uplink control information and the uplink data on the physical uplink channel. When the quantity of the REs configured for the physical uplink channel is 96, because 96<208, the terminal device sends only the uplink control information on the physical uplink channel.

It should be understood that, the foregoing merely uses an example in which the threshold is a quantity of REs for description, and this should not constitute any limitation on this application. The threshold is not limited to the quantity of REs, and for example, may further include a quantity of RBs and a quantity of REs. A corresponding first preset condition may be any one of (a') to (e') enumerated above. The first resource unit may be an RE, and the second resource unit may be an RB. That is, the quantity of REs and the quantity of RBs are used in combination as the first preset condition.

(a') in the first preset condition enumerated above is used as an example. If a quantity that is of REs on the physical uplink channel and that is configured by the network device is less than or equal to 208, and a quantity that is of RBs occupied by the physical uplink channel and that is configured by the network device is less than or equal to 5 (refer to the threshold corresponding to the type I codebook above), the terminal device may send only the uplink control information on the physical uplink channel. If a quantity that is of REs on the physical uplink channel and that is configured by the network device is greater than 208, or the network device configures that a quantity of RBs on the physical uplink channel is greater than 5, the terminal device may send the uplink control information and the uplink data on the physical uplink channel. The foregoing enumerates the correspondences between configuration parameters and thresholds based on the combinations of the configuration parameters. However, it should be understood that, the foregoing examples are merely for description, and shall not constitute any limitation on this application. In addition, this application does not exclude a possibility of calculating the threshold and determining the correspondence between the configuration parameters and the thresholds based on a combination of more or fewer configuration parameters.

It should be further understood that, in the foregoing embodiment, the correspondence between the configuration parameters and the thresholds is described in detail by expressing the threshold as a quantity of RBs, a quantity of REs, and a quantity of symbols. However, this should not constitute any limitation on this application. The threshold may alternatively be expressed in a quantity of subcarriers, subframes, or the like. When the threshold is defined as a quantity of resource units of another type, a specific calculation process is similar to the foregoing description. For brevity, detailed description of the calculation process is omitted herein.

The foregoing enumerates the correspondences between the configuration parameters and the thresholds with reference to different configuration parameters. However, it should be understood that, this is merely an example provided for ease of understanding, and should not constitute any limitation on this application. A specific value of the thresholds enumerated above are also determined based only on existing configuration parameters. This application does not exclude a possibility of assigning a new definition in a future protocol. Therefore, this application does not exclude a possibility that the threshold determined based on the correspondence between the configuration parameters and the thresholds exceeds a range of the foregoing examples either.

The foregoing determines, based on the relationship between the resource on the physical uplink channel and the threshold, whether to transmit only the uplink control information on the physical uplink channel. The following provides another communication method, so that whether to transmit only the uplink control information on the physical uplink channel can be directly determined based on the configuration parameter.

Figure 3:
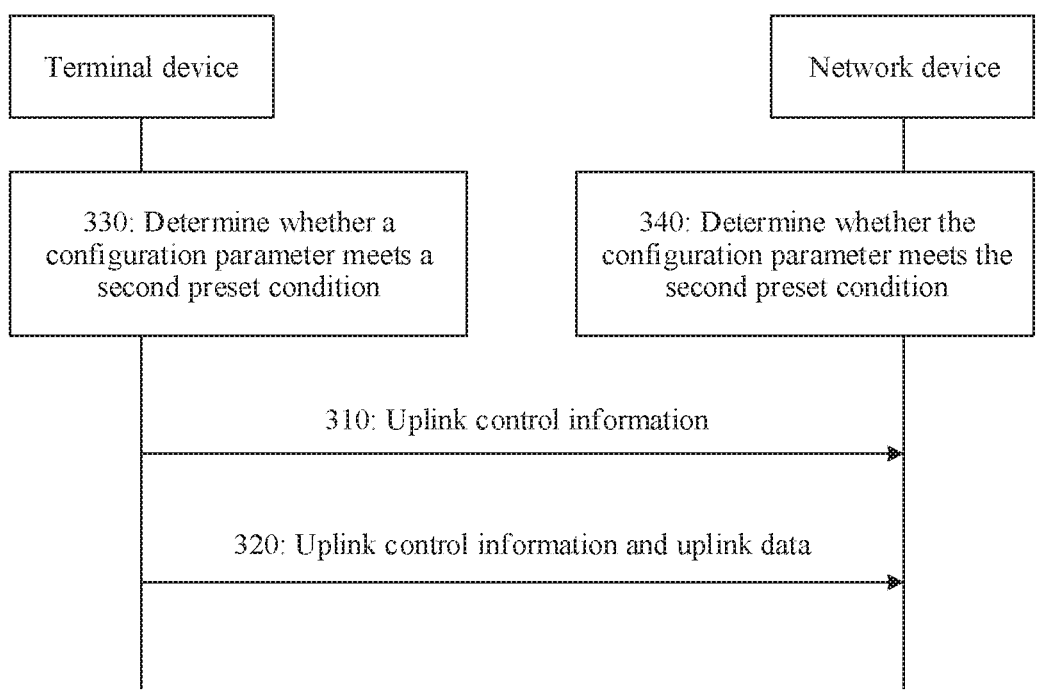
FIG. 3 is a schematic flowchart of a communication method according to another embodiment of this application.

FIG. 3 is a schematic flowchart of a communication method 300 according to another embodiment of this application from a perspective of device interaction. As shown in the figure, the method 300 shown in FIG. 3 may include step 310 to step 340. The following describes the method 300 in detail with reference to FIG. 3.

In step 310, when a configuration parameter meets a second preset condition, a terminal device sends only uplink control information on a physical uplink channel. The configuration parameter includes one or more of the following: a CSI process feature, a feedback feature, and a codebook feature.

Correspondingly, in step 310, when the configuration parameter meets the second preset condition, a network device receives only the uplink control information on the physical uplink channel. The configuration parameter includes the one or more of the following: the CSI process feature, the feedback feature, and the codebook feature.

Specifically, the configuration parameter may be a configuration parameter corresponding to the terminal device. Alternatively, the configuration parameter corresponding to the terminal device may be referred to as a configuration parameter of the terminal device for short. The configuration parameter may be understood as a parameter that is configured for the terminal device and that may be used to indicate a feature of one or more of, for example, a CSI process, a feedback, and a codebook. The configuration parameter may include only one of the foregoing enumerations, or may include some or all of the foregoing enumerations.

It should be understood that, the foregoing enumerated configuration parameters are described in detail in the method 200. For brevity, details are not described herein again.

In this embodiment of this application, the configuration parameter of the terminal device may be configured by the network device for the terminal device, or may be predefined.

If the configuration parameter is configured by the network device for the terminal device, optionally, the method 200 further includes: receiving, by the terminal device, information about the configuration parameter.

Correspondingly, the network device sends the information about the configuration parameter.

It should be understood that, a specific method for sending the information about the configuration parameter by the network device has been described in detail in the method 200. For brevity, details are not described herein again.

If the configuration parameter is predefined, definitions of the configuration parameter for the network device and the terminal device may be consistent. The configuration parameter may be defined in a protocol, or may be preset by an operator before delivery of a device. This is not limited in this application.

It should be understood that, the foregoing enumerated specific method for obtaining the configuration parameter by the terminal device is merely an example for description, and shall not constitute any limitation on this application. A specific method for obtaining the configuration parameter by the terminal device is not limited in this application.

The second preset condition may include:

(i) the CSI process feature is that FeCoMP CSI is enabled;

(ii) the CSI process feature is that FeCoMP CSI is enabled, and the feedback feature indicates that the feedback mode is a mode 3-2:

(iv) the CSI process feature is that FeCoMP CSI is enabled, and the codebook feature indicates that a codebook type is an enhanced CSI codebook:

(v) the feedback feature indicates a sub-band precoding matrix indicator PMI feedback and a sub-band channel quality indicator CQI feedback;

(vi) the codebook feature indicates that a codebook type is a type II codebook;

(vii) the codebook feature indicates that a codebook type is a type II codebook, and the feedback feature indicates a sub-band PMI feedback and sub-band CQI feedback: or (viii) the feedback feature indicates that a quantity of fed-back CSI is greater than 1.

In other words, when the configuration parameter of the terminal device meets any one of (i) to (viii), it may be considered that the configuration parameter meets the second preset condition. That the second preset condition may be specifically which one of (i) to (viii) may be agreed on by the network device and the terminal device in advance, for example, defined in a protocol, or determined by the network device and then notified by the network device to the terminal device. This is not limited in this application.

It should be understood that, the several pieces of possible specific content of the second preset condition that are enumerated above are merely examples for description, and shall not constitute any limitation on this application.

In this embodiment of this application, if the configuration parameter of the terminal device meets the second preset condition, the terminal device may send only the uplink control information but not send data on the physical uplink channel. In other words, when the configuration parameter of the terminal device meets the second preset condition, sending the uplink data on the physical uplink channel is forbidden.

It should be noted that, "the terminal device sends only uplink control information on the physical uplink channel" described herein is relative to sending of the uplink data. In other words, for the uplink data and the uplink control information, the terminal device sends only the uplink control information but does not send the uplink data. Therefore, "the terminal device sends only uplink control information on the physical uplink channel" does not mean that the terminal device does not send another signal, for example, a reference signal, on the physical uplink channel. A person skilled in the art may understand a meaning thereof.

Optionally, the method further includes: In step 320, when the configuration parameter does not meet the second preset condition, the terminal device sends the uplink control information and the uplink data on the physical uplink channel.

Correspondingly, in step 320, when the configuration parameter does not meet the second preset condition, the network device receives the uplink control information and the uplink data on the physical uplink channel.

Specifically, if the configuration parameter of the terminal device does not meet the second preset condition, the terminal device may send the uplink control information and the uplink data on the physical uplink channel. In other words, when the configuration parameter of the terminal device does not meet the second preset condition, a specific signal sent by the terminal device on the physical uplink channel is not limited.

That the configuration parameter of the terminal device does not meet the second preset condition may include specifically: The configuration parameter of the terminal device does not meet any one of (i) to (viii) enumerated above. Specifically, the second preset condition used by the network device and the terminal device in step 320 is the same as the second preset condition used in step 310. To be specific, if the network device and the terminal device use the foregoing enumerated (i) as the second preset condition in step 310, the network device and the terminal device also use (i) as the second preset condition in step 320, and so on.

It should be noted that, the uplink control information may be periodically or discretely sent in time domain. At a moment, if the terminal device needs to send uplink control information, the terminal device may send a scheduling request to the network device in advance, to request the network device to allocate a resource. The network device may allocate the resource to the terminal device, so that the terminal device sends a physical uplink channel on the allocated resource. For example, the terminal device may determine, according to the method provided in this application, whether to send only uplink control information on the physical uplink channel. When the configuration parameter of the terminal device meets a second preset condition, only the uplink control information is sent. When the configuration parameter of the terminal device does not meet a second preset condition, the uplink control information and the data are sent. However, this application does not exclude a possibility that only the uplink control information is sent on the physical uplink channel when the configuration parameter of the terminal device meets the second preset condition, and does not exclude a possibility that only the uplink data is sent on the physical uplink channel when the configuration parameter of the terminal device does not meet the second preset condition either. It should be understood that, the foregoing two possible cases are described by using examples in the method 200. For brevity, details are not described herein again.

Optionally, the method 300 further includes step 330: The terminal device determines whether the configuration parameter meets the second preset condition.

Correspondingly, the method 300 further includes step 340: The network device determines whether the configuration parameter meets the second preset condition.

The terminal device and the network device may separately determine, based on the configuration parameter of the terminal device, whether any item of the second preset condition is met, and correspondingly perform the action in step 310 or step 320 when the second preset condition is met or not met.

Based on the foregoing technical solution, the network device and the terminal device may separately determine, based on the configuration parameter, whether to transmit only the uplink control information on the physical uplink channel. Therefore, the network device can correctly receive the uplink control information and/or the uplink data. This helps improve data transmission reliability, thereby helping improve transmission performance of a communications system.

It should be understood that, merely for ease of understanding, the foregoing describes in detail, by using interaction between the network device and the terminal device as an example, the communication method provided in this embodiment of this application. However, this should not constitute any limitation on this application. For example, the network device that sends the information about the configuration parameter to the terminal device and the network device that receives the uplink control information may be a same network device or different network devices. This is not limited in this application.

It should be further understood that, FIG. 3 schematically shows, merely for ease of understanding, the steps performed by the terminal device and the network device. However, this does not mean that the terminal device and the network device perform each step shown in the figure. For example, the terminal device may perform either step 310 or step 320 based on a relationship between the resource on the physical uplink channel allocated to the terminal device and the threshold.

The foregoing enumerates, based on the configuration parameter of the terminal device, a plurality of methods for determining, based on the configuration parameter, whether to send only the uplink control information on the physical uplink channel. For example, content to be sent on the physical uplink channel is determined based on a relationship between the threshold corresponding to the configuration parameter and the physical uplink channel, or is directly determined based on the configuration parameter.

Figure 4:
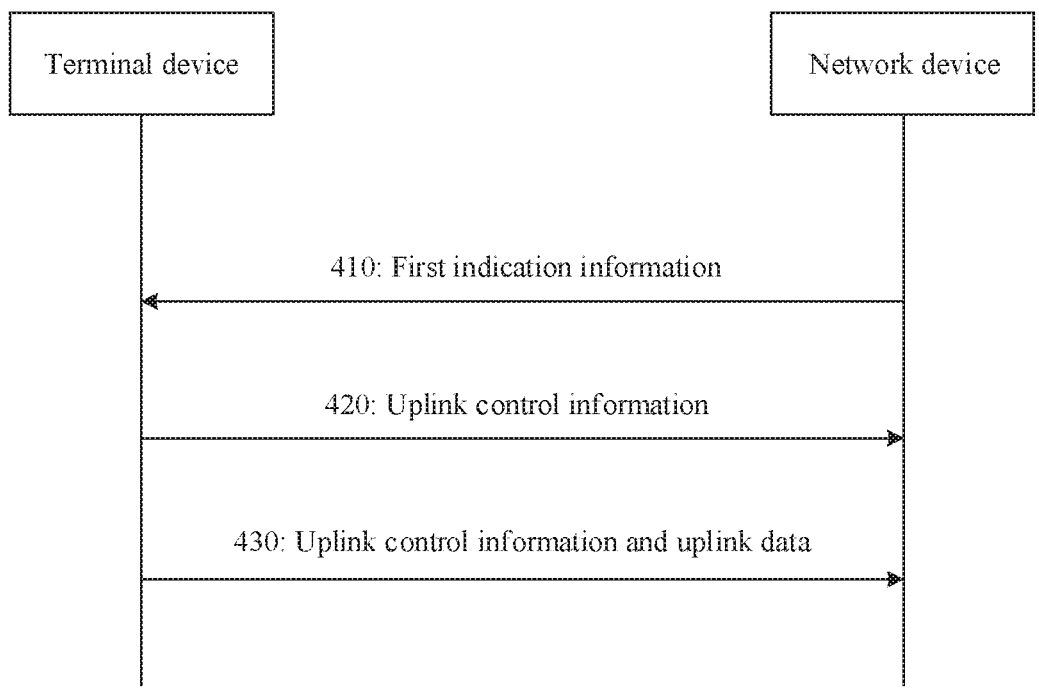
FIG. 4 is a schematic flowchart of a communication method according to still another embodiment of this application.

This application further provides a method. A terminal device may directly determine, based on an indication of the network device, content to be sent on a physical uplink channel. FIG. 4 is a schematic flowchart of a communication method 400 according to still another embodiment of this application from a perspective of device interaction.

As shown in FIG. 4, the method 400 includes step 410 to step 430.

Step 410: A terminal device receives first indication information, where the first indication information is used to indicate whether the terminal device sends only uplink control information on a physical uplink channel.

Correspondingly, a network device sends the first indication information, where the first indication information is used to indicate whether the terminal device sends only the uplink control information on the physical uplink channel.

Specifically, the first indication information may be information carried in higher layer signaling, for example, an RRC message or a MAC CE. Alternatively, the first indication information may be information carried in physical layer signaling, for example, DCI. The first indication information may be used to indicate, by using a newly added field in higher layer signaling or physical layer signaling, whether to send only the uplink control information on the physical uplink channel. The newly added field may be, for example, a UCI only (UCI only) field or a UE content (UE content) field.

For example, when the UCI only field indicates that UCI-only=true, it may indicate that only the uplink control information is sent on the physical uplink channel. When the UCI only field indicates that UCI-only=false, it may indicate that the uplink control information and uplink data are sent on the physical uplink channel.

Alternatively, when the UE content field is set to "0", it may indicate that only the uplink control information is sent on the physical uplink channel. When the UE content field is set to "1", it may indicate that the uplink control information and uplink data are sent on the physical uplink channel. Alternatively, when the UE content field is set to "00", it may indicate that only the uplink control information is sent on the physical uplink channel. When the UE content field is set to "01", it may indicate that the uplink control information and uplink data are sent on the physical uplink channel. When the UE content field is set to "10", it may indicate that the uplink data is sent on the physical uplink channel. When the UE content field is set to "11", it indicates a reserved state.

It should be understood that, the signaling that carries the first indication information, the fields that carry the first indication information, and the specific manners of indicating, by using the foregoing enumerated fields, whether to send only the uplink control information on the physical uplink channel are merely examples for description, and shall not constitute any limitation on this application. For example, the first indication information may alternatively be indicated by using another existing field. This is not limited in this application.

In step 420, when the first indication information is used to indicate that only the uplink control information is to be sent on the physical uplink channel, the terminal device sends only the uplink control information on the physical uplink channel.

Correspondingly, in step 430, when the first indication information is used to indicate that only the uplink control information is sent on the physical uplink channel, the network device receives only the uplink control information on the physical uplink channel.

It should be understood that, a specific process of step 420 is the same as a specific process of step 230 in the method 200 and step 310 in the method 300. For brevity, details are not described herein again.

Optionally, the method 400 further includes step 430: When the first indication information is used to indicate that content sent on the physical uplink channel is not limited to the uplink control information, the terminal device sends the uplink control information and the uplink data or sends the uplink data on the physical uplink channel.

Correspondingly, in step 430, when the first indication information is used to indicate that content sent on the physical uplink channel is not limited to the uplink control information, the network device receives the uplink control information and the uplink data or receives the uplink data on the physical uplink channel.

It should be understood that, a specific process of step 430 is the same as a specific process of step 240 in the method 200 and step 320 in the method 300. The foregoing has described, with reference to a specific case, a case in which the terminal device may send the uplink control information and the uplink data and a case in which the terminal device may send only the uplink data. For brevity, details are not described herein again.

Based on the foregoing technical solution, the terminal device may determine, based on an indication of the network device, content to be sent on the physical uplink channel, or the network device may receive corresponding content on the physical uplink channel based on the same indication. Therefore, the network device can correctly receive the uplink control information and/or the uplink data. This helps improve data transmission reliability, thereby helping improve transmission performance of a communications system.

It should be understood that, merely for ease of understanding, the foregoing describes in detail, by using interaction between the network device and the terminal device as an example, the communication method provided in this embodiment of this application. However, this should not constitute any limitation on this application. For example, the network device that sends the information about the configuration parameter to the terminal device and the network device that receives the uplink control information may be a same network device or different network devices. This is not limited in this application.

It should be understood that, sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The foregoing describes in detail the communication methods in the embodiments of this application with reference to FIG. 2 to FIG. 4. The following describes in detail the communications apparatus in the embodiments of this application with reference to FIG. 5 to FIG. 7.

Figure 5:
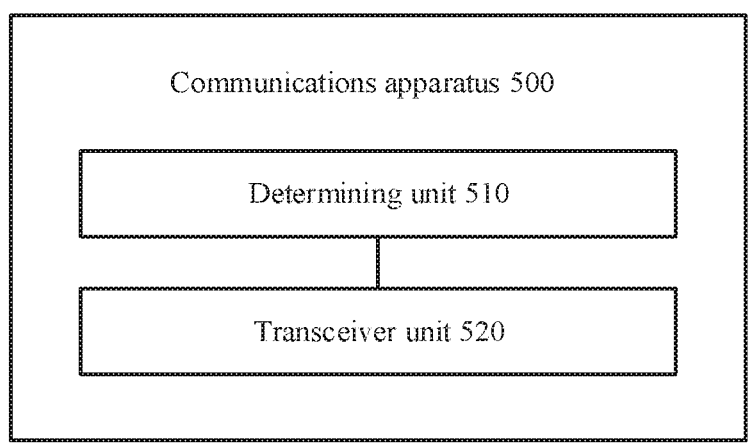
FIG. 5 is a schematic block diagram of a communications apparatus according to an embodiment of this application.

FIG. 5 is a schematic block diagram of a communications apparatus according to an embodiment of this application: As shown in FIG. 5, the communications apparatus 500 may include a determining unit 510 and a transceiver unit 520.

In a possible design, the communications apparatus 500 may be a terminal device or a chip configured in a terminal device.

In a possible implementation, the determining unit 510 may be configured to determine a threshold based on a configuration parameter, where the configuration parameter includes one or more of the following: a channel state information process CSI process feature, a feedback feature, a codebook feature, and a resource feature that is of a physical uplink channel.

If the resource on the physical uplink channel and the threshold meet a first preset condition, the transceiver unit 520 may be configured to send only uplink control information on the physical uplink channel.

Optionally, if the resource on the physical uplink channel and the threshold do not meet the first preset condition, the transceiver unit 520 may be further configured to send the uplink control information and the uplink data on the physical uplink channel.

Optionally, the threshold is X resource units, the physical uplink channel occupies P resource units, and X and P are positive integers.

The first preset condition includes:
P<X;
P≤X;
P≤X±T, where T is a predefined value or is indicated by a network device;
P<X/2; or
P<2X.

Optionally, the resource unit includes an RB, a symbol, or an RE.

Optionally, the threshold is greater than or equal to a minimum resource used to transmit the uplink control information.

Optionally, if the CSI process feature is that further enhancements to coordinated multi-point channel state information FeCoMP CSI is enabled, the threshold is eight RBs, nine RBs, or 10 RBs.

Optionally, if a feedback mode is any one of a mode 2-0, a mode 1-0, or a mode 1-1, the threshold is two RBs or four RBs.

Optionally, if a feedback mode is any one of a mode 3-1, a mode 1-2, a mode 3-0, a mode 2-2, or a mode 3-2, the threshold is eight RBs, nine RBs, or 10 RBs.

Optionally, if the CSI process feature is that FeCoMP CSI is enabled, and a feedback mode is any one of a mode 3-2, a mode 1-2, a mode 3-0, a mode 2-2, or a mode 3-2, the threshold is eight RBs, nine RBs, or 10 RBs.

Optionally, if the CSI process feature is that FeCoMP CSI is enabled, and a codebook type is an enhanced codebook, the threshold is 11 RBs or 12 RBs.

Optionally, if the CSI process feature is that FeCoMP CSI is enabled, and a codebook type is a non-enhanced codebook, the threshold is four RBs or five RBs.

Optionally, if a codebook type in the codebook feature is a type I codebook, the threshold is five RBs, six RBs, seven RBs, or eight RBs.

Optionally, if a codebook type in the codebook feature is a type II codebook, the threshold is 30 RBs, 32 RBs, or 34 RBs.

Optionally, if the feedback feature is a wideband feedback, the threshold is seven RBs, eight RBs, or nine RBs.

Optionally, if the feedback feature is a sub-band feedback, the threshold is 30 RBs, 35 RBs, or 40 RBs.

Optionally, if a beam quantity in the codebook feature is 4, the threshold is 25 RBs, 30 RBs, 32 RBs, 35 RBs, or 40 RBs.

Optionally, if a beam quantity in the codebook feature is 2, the threshold is 15 RBs, 17 RBs, or 20 RBs.

Optionally, the determining unit 510 is specifically configured to:

determine a coefficient based on the configuration parameter, where the configuration parameter includes a codebook parameter, feedback bandwidth, or a quantity of pieces of fed-back CSI: and determine the threshold based on the coefficient and a pre-obtained reference threshold.

Optionally, the resource feature of the physical uplink channel includes a quantity of symbols occupied by a time domain resource on the physical uplink channel, a quantity of resource blocks corresponding to a frequency domain resource on the physical uplink channel, or a quantity of resource elements occupied by a time-frequency resource on the physical uplink channel.

Optionally, the CSI process feature includes: Further enhancements to coordinated multi-point channel state information FeCoMP CSI is enabled, or FeCoMP CSI is unable.

Optionally, the feedback feature includes one or more of the following: a feedback type, the feedback bandwidth, and the quantity of pieces of fed-back CSI.

Optionally, the codebook feature includes the codebook type and/or the codebook parameter.

Optionally, the transceiver unit 520 is further configured to receive information about the configuration parameter.

Specifically, the communications apparatus 500 may correspond to the terminal device in the communication method 200 in the embodiments of the present invention, and the communications apparatus 500 may include modules configured to perform the method performed by the terminal device in the communication method 200 in FIG. 2. In addition, the modules in the communications apparatus 500 and the foregoing other operations and/or functions are separately for implementing a corresponding procedure of the communication method 200 in FIG. 2. Specifically, the determining unit 510 is configured to perform step 210 and step 250 in the method 200, the transceiver unit 520 is configured to perform step 230 or 240 in the method 200. A specific process in which each unit performs the foregoing corresponding step is described in detail in the method 200. For brevity, details are not described herein again.

In another possible implementation, when a configuration parameter meets a second preset condition, the transceiver unit 520 may be configured to send only uplink control information on a physical uplink channel, where the configuration parameter includes one or more of the following: a channel state information process CSI process feature, a feedback feature, and a codebook feature.

The second preset condition includes:

the CSI process feature indicates that further enhancements to coordinated multi-point channel state information FeCoMP CSI is enabled:

the CSI process feature indicates that FeCoMP CSI is enabled, and the feedback feature indicates that a feedback mode is a mode 3-2;

the CSI process feature indicates that FeCoMP CSI is enabled, and the codebook feature indicates that a codebook type is an enhanced CSI codebook;

the feedback feature indicates a sub-band precoding matrix indicator PMI feedback and a sub-band channel quality indicator CQI feedback;

the codebook feature indicates that a codebook type is a type II type II codebook;

the codebook feature indicates that a codebook type is a type II codebook, and the feedback feature indicates a sub-band PMI feedback and a sub-band CQI feedback: or the feedback feature indicates that a quantity of pieces of fed-back CSI is greater than 1.

Optionally, when the configuration parameter does not meet the second preset condition, the transceiver unit 520 may be further configured to send the uplink control information and uplink data on the physical uplink channel.

Optionally, the CSI process feature includes: Further enhancements to coordinated multi-point channel state information FeCoMP CSI is enabled, or FeCoMP CSI is unable.

Optionally, the feedback feature includes one or more of the following: a feedback type, the feedback bandwidth, and the quantity of pieces of fed-back CSI.

Optionally, the codebook feature includes the codebook type and/or the codebook parameter.

Optionally, the transceiver unit 520 may be further configured to receive information about the configuration parameter.

Specifically, the communications apparatus 500 may correspond to the terminal device in the communication method 300 in the embodiments of the present invention, and the communications apparatus 500 may include modules configured to perform the method performed by the terminal device in the communication method 300 in FIG. 3. In addition, the modules in the communications apparatus 500 and the foregoing other operations and/or functions are separately for implementing a corresponding procedure of the communication method 300 in FIG. 3. Specifically, the determining unit 510 is configured to perform step 330 in the method 300, and the transceiver unit 520 is configured to perform step 310 or 320 in the method 300. A specific process in which each unit performs the foregoing corresponding step is described in detail in the method 200. For brevity, details are not described herein again.

In another possible design, the communications apparatus 500 may be a network device or a chip configured in a network device.

In a possible implementation, the determining unit 510 may be configured to determine a threshold based on a configuration parameter, where the configuration parameter includes one or more of the following: a channel state information process CSI process feature, a feedback feature, a codebook feature, and a resource feature that is of a physical uplink channel.

If the resource on the physical uplink channel and the threshold meet a first preset condition, the transceiver unit 520 may be configured to receive only uplink control information on the physical uplink channel.

Optionally, if the resource on the physical uplink channel and the threshold do not meet the first preset condition, the transceiver unit 520 may be further configured to receive the uplink control information and the uplink data on the physical uplink channel.

Optionally, the threshold is X resource units, the physical uplink channel occupies P resource units, and X and P are positive integers.

The first preset condition includes:

$P<X$;

$P \leq X$;

$P \leq X \pm T$, where T is a predefined value or is indicated by a network device;

$P<X/2$; or $P<2X$.

Optionally, the resource unit includes an RB, a symbol, or an RE.

Optionally, the threshold is greater than or equal to a minimum resource used to transmit the uplink control information.

Optionally, if the CSI process feature is that further enhancements to coordinated multi-point channel state information FeCoMP CSI is enabled, the threshold is eight RBs, nine RBs, or 10 RBs.

Optionally, if a feedback mode is any one of a mode 2-0, a mode 1-0, or a mode 1-1, the threshold is two RBs or four RBs.

Optionally, if a feedback mode is any one of a mode 3-1, a mode 1-2, a mode 3-0, a mode 2-2, or a mode 3-2, the threshold is eight RBs, nine RBs, or 10 RBs.

Optionally, if the CSI process feature is that FeCoMP CSI is enabled, and a feedback mode is any one of a mode 3-2, a mode 1-2, a mode 3-0, a mode 2-2, or a mode 3-2, the threshold is eight RBs, nine RBs, or 10 RBs.

Optionally, if the CSI process feature is that FeCoMP CSI is enabled, and a codebook type is an enhanced codebook, the threshold is 11 RBs or 12 RBs.

Optionally, if the CSI process feature is that FeCoMP CSI is enabled, and a codebook type is a non-enhanced codebook, the threshold is four RBs or five RBs.

Optionally, if a codebook type in the codebook feature is a type I codebook, the threshold is five RBs, six RBs, seven RBs, or eight RBs.

Optionally, if a codebook type in the codebook feature is a type II codebook, the threshold is 30 RBs, 32 RBs, or 34 RBs.

Optionally, if the feedback feature is a wideband feedback, the threshold is seven RBs, eight RBs, or nine RBs.

Optionally, if the feedback feature is a sub-band feedback, the threshold is 30 RBs, 35 RBs, or 40 RBs.

Optionally, if a beam quantity in the codebook feature is 4, the threshold is 25 RBs, 30 RBs, 32 RBs, 35 RBs, or 40 RBs.

Optionally, if a beam quantity in the codebook feature is 2, the threshold is 15 RBs, 17 RBs, or 20 RBs.

Optionally, the determining unit 510 is specifically configured to:

determining a coefficient based on the configuration parameter, where the configuration parameter includes a codebook parameter, feedback bandwidth, or a quantity of pieces of fed-back CSI; and determine the threshold based on the coefficient and a pre-obtained reference threshold.

Optionally, the resource feature of the physical uplink channel includes a quantity of symbols occupied by a time domain resource on the physical uplink channel, a quantity of resource blocks corresponding to a frequency domain resource on the physical uplink channel, or a quantity of resource elements occupied by a time-frequency resource on the physical uplink channel.

Optionally, the CSI process feature includes: Further enhancements to coordinated multi-point channel state information FeCoMP CSI is enabled, or FeCoMP CSI is unable.

Optionally, the feedback feature includes one or more of the following: a feedback type, the feedback bandwidth, and the quantity of pieces of fed-back CSI.

Optionally, the codebook feature includes the codebook type and/or the codebook parameter.

Optionally, the transceiver unit 520 is further configured to send information about the configuration parameter.

Specifically, the communications apparatus 500 may correspond to the network device in the communication method 200 in the embodiments of the present invention, and the communications apparatus 500 may include modules configured to perform the method performed by the network device in the communication method 200 in FIG. 2. In addition, the modules in the communications apparatus 500 and the foregoing other operations and/or functions are separately for implementing a corresponding procedure of the communication method 200 in FIG. 2. Specifically, the determining unit 510 is configured to perform step 220 and step 260 in the method 200, the transceiver unit 520 is configured to perform step 230 or 240 in the method 200. A specific process in which each unit performs the foregoing corresponding step is described in detail in the method 200. For brevity, details are not described herein again.

In another possible implementation, when a configuration parameter meets a second preset condition, the transceiver unit 520 may be configured to receive only uplink control information on a physical uplink channel, where the configuration parameter includes one or more of the following: a channel state information process CSI process feature, a feedback feature, and a codebook feature.

The second preset condition includes:

the CSI process feature indicates that further enhancements to coordinated multi-point channel state information FeCoMP CSI is enabled;

the CSI process feature indicates that FeCoMP CSI is enabled, and the feedback feature indicates that a feedback mode is a mode 3-2;

the CSI process feature indicates that FeCoMP CSI is enabled, and the codebook feature indicates that a codebook type is an enhanced CSI codebook;

the feedback feature indicates a sub-band precoding matrix indicator PMI feedback and a sub-band channel quality indicator CQI feedback;

the codebook feature indicates that a codebook type is a type II type II codebook;

the codebook feature indicates that a codebook type is a type II codebook, and the feedback feature indicates a sub-band PMI feedback and a sub-band CQI feedback; or the feedback feature indicates that a quantity of pieces of fed-back CSI is greater than 1.

Optionally, when the configuration parameter does not meet the second preset condition, the transceiver unit 520 may be further configured to receive the uplink control information and uplink data on the physical uplink channel.

Optionally, the CSI process feature includes: Further enhancements to coordinated multi-point channel state information FeCoMP CSI is enabled, or FeCoMP CSI is unable.

Optionally, the feedback feature includes one or more of the following: a feedback type, the feedback bandwidth, and the quantity of pieces of fed-back CSI.

Optionally, the codebook feature includes the codebook type and/or the codebook parameter.

Optionally, the transceiver unit 520 may be further configured to send information about the configuration parameter.

Specifically, the communications apparatus 500 may correspond to the network device in the communication method 300 in the embodiments of the present invention, and the communications apparatus 500 may include modules configured to perform the method performed by the network device in the communication method 300 in FIG. 3. In addition, the modules in the communications apparatus 500 and the foregoing other operations and/or functions are separately for implementing a corresponding procedure of the communication method 300 in FIG. 2. Specifically, the determining unit 510 is configured to perform step 340 in the method 300, and the transceiver unit 520 is configured to perform step 310 or 320 in the method 300. A specific process in which each unit performs the foregoing corresponding step is described in detail in the method 200. For brevity, details are not described herein again.

Figure 6:
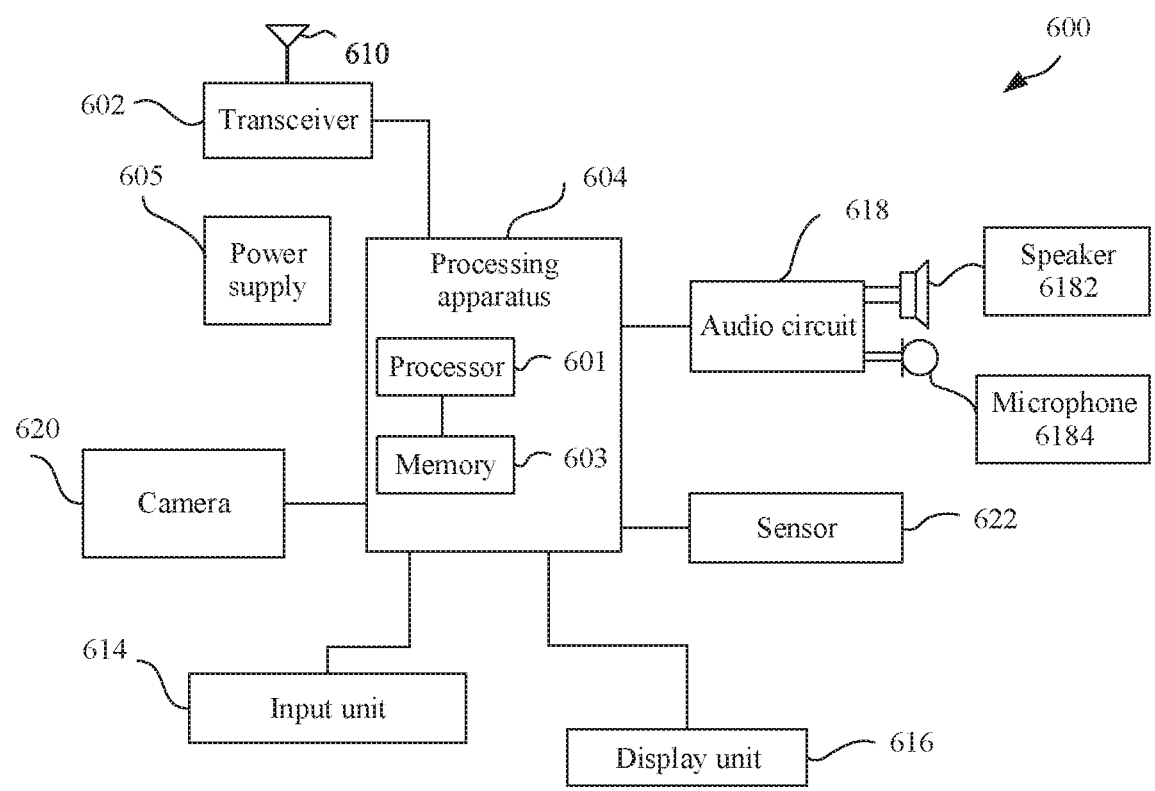
FIG. 6 is a schematic structural diagram of a terminal device according to an embodiment of this application.

FIG. 6 is a schematic structural diagram of a terminal device 600 according to an embodiment of this application. As shown in FIG. 6, the terminal device 600 includes a processor 601 and a transceiver 602. Optionally, the terminal device 600 further includes a memory 603. The processor 602, the transceiver 602, and the memory 603 communicate with each other by using an internal connection path, to transfer a control signal and/or a data signal. The memory 603 is configured to store a computer program. The processor 601 is configured to invoke the computer program from the memory 603 and run the computer program, to control the transceiver 602 to send and receive a signal.

The processor 601 and the memory 603 may be combined into one processing apparatus 604. The processor 601 is configured to execute program code stored in the memory 603, to implement the foregoing function. During specific implementation, the memory 603 may alternatively be integrated into the processor 601, or may be independent of the processor 601. The terminal device 600 may further include an antenna 610 that is configured to send, by using a radio signal, uplink data or uplink control signaling output by the transceiver 602.

Specifically, the terminal device 600 may correspond to the terminal device in the communication method 200 according to the embodiment of this application. The terminal device 600 may include modules configured to perform the method performed by the terminal device in the communication method 200 in FIG. 2. The modules in the terminal device 600 and the foregoing other operations and/or functions are separately for implementing corresponding procedures of the communication method 200 in FIG. 2. Specifically, the memory 603 is configured to store program code, so that when executing the program code, the processor 601 performs step 210 and step 240 in the method 200, and controls the transceiver 602 to perform step 220 or step 230 in the method 200. A specific process of performing the foregoing corresponding step by each module is described in detail in the method 200. For brevity, details are not described herein again.

Alternatively, the terminal device 600 may correspond to the terminal device in the communication method 300 according to the embodiment of this application. The terminal device 600 may include modules configured to perform the method performed by the terminal device in the communication method 300 in FIG. 3. The modules in the terminal device 600 and the foregoing other operations and/or functions are separately for implementing corresponding procedures of the communication method 300 in FIG. 3. Specifically, the memory 603 is configured to store program code, so that when executing the program code, the processor 601 performs step 330 in the method 300, and controls the transceiver 602 to perform step 310 or step 320 in the method 300. A specific process of performing the foregoing corresponding step by each module is described in detail in the method 200. For brevity, details are not described herein again.

The processor 601 may be configured to perform an action implemented inside the terminal in the foregoing method embodiments, and the transceiver 602 may be configured to perform an action of transmission or sending from the terminal to the network device in the foregoing method embodiments. For details, refer to the descriptions in the foregoing method embodiment. Details are not described herein again.

The processor 601 and the memory 603 may be integrated into one processing apparatus. The processor 601 is configured to execute the program code stored in the memory 603 to implement the foregoing functions. During specific implementation, the memory 603 may alternatively be integrated into the processor 601.

The terminal device 600 may further include a power supply 605, configured to supply power to various components or circuits in the terminal.

In addition, to make functions of the terminal device more perfect, the terminal device 600 may further include one or more of an input unit 614, a display unit 616, an audio circuit 618, a camera 620, a sensor 622, and the like, and the audio circuit may further include a speaker 6182, a microphone 6184, and the like.

Figure 7:
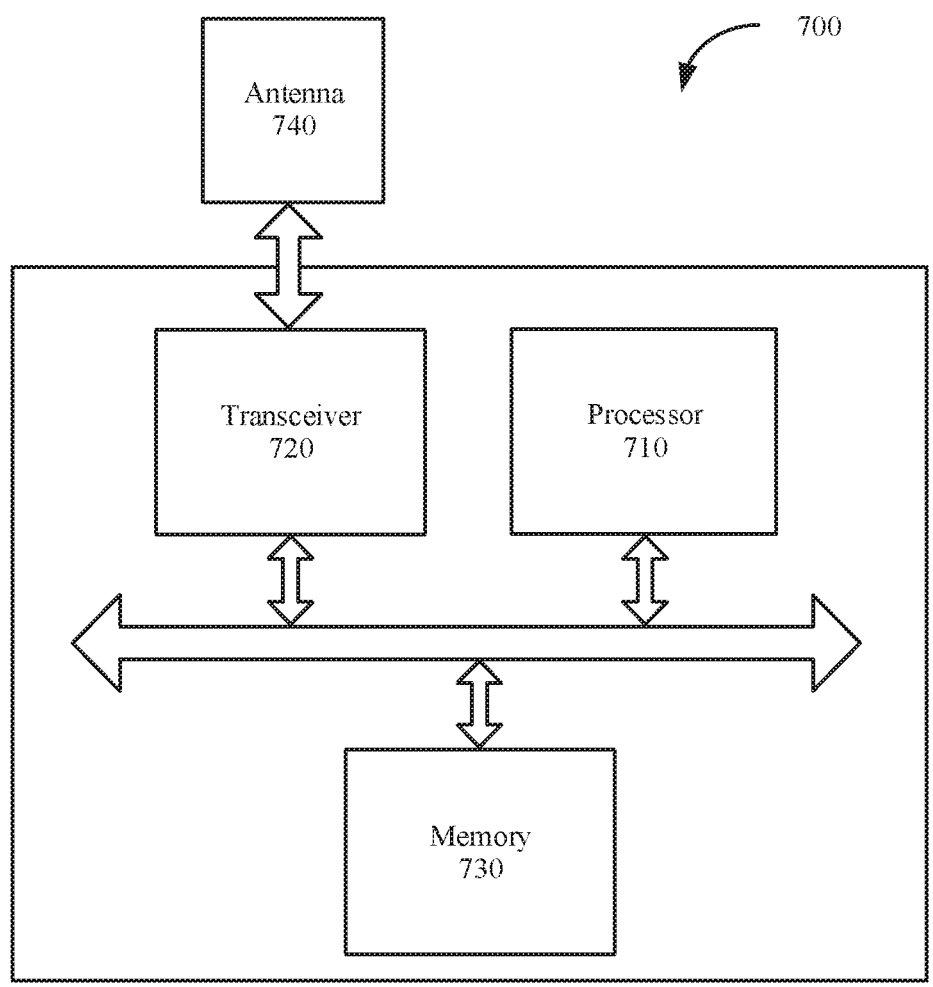
FIG. 7 is a schematic structural diagram of a network device according to an embodiment of this application.

FIG. 7 is a schematic structural diagram of a network device 700 according to an embodiment of this application. As shown in FIG. 7, the network device 700 includes a processor 710 and a transceiver 720. Optionally, the network device 700 further includes a memory 730. The processor 710, the transceiver 720, and the memory 730 communicate with each other by using an internal connection path, to transfer a control signal and/or a data signal. The memory 730 is configured to store a computer program. The processor 710 is configured to invoke the computer program from the memory 730 and run the computer program, to control the transceiver 720 to send and receive a signal.

The processor 710 and the memory 730 may be integrated into a processing apparatus. The processor 710 is configured to execute program code stored in the memory 730 to implement the foregoing functions. During specific implementation, the memory 730 may alternatively be integrated into the processor 710, or may be independent of the processor 710.

The network device may further include an antenna 740, configured to send, by using a radio signal, uplink data or uplink control signaling output by the transceiver 720.

Specifically, the network device 700 may correspond to the network device in the communication method 200 in the embodiment of this application, and the network device 700 may include modules configured to perform the method performed by the network device in the communication method 200 in FIG. 2. The modules in the network device 700 and the foregoing other operations and/or functions are separately for implementing the corresponding procedures of the communication method 200 in FIG. 2. Specifically, the memory 730 is configured to store program code, so that when executing the program code, the processor 710 performs step 220 and step 260 in the method 200, and controls the transceiver 720 to perform step 230 or step 240 in the method 200 by using the antenna 740. A specific process of performing the foregoing corresponding step by each module is described in detail in the method 200. For brevity, details are not described herein again.

Alternatively, the network device 700 may correspond to the network device in the communication method 300 in the embodiment of this application, and the network device 700 may include modules configured to perform the method performed by the network device in the communication method 300 in FIG. 3. In addition, the modules in the network device 700 and the foregoing other operations and/or functions are separately for implementing the corresponding procedures of the communication method 300 in FIG. 3. Specifically, the memory 730 is configured to store program code, so that when executing the program code, the processor 710 performs step 340 in the method 300, and controls the transceiver 720 to perform step 310 or step 320 in the method 300 by using the antenna 740. A specific process of performing the foregoing corresponding step by each module is described in detail in the method 300. For brevity, details are not described herein again.

It should be understood that, the processor in the embodiments of this application may be a central processing unit (central processing unit. CPU), or may further be another general purpose processor, a digital signal processor (digital signal processor, DSP), an application-specific integrated circuit (application specific integrated circuit, ASIC), a field programmable gate array (field programmable gate array, FPGA) or another programmable logical device, a discrete gate or transistor logical device, a discrete hardware component, or the like. The general purpose processor may be a microprocessor, or the processor may be any conventional processor or the like.

It may be understood that the memory in the embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of random access memory (random access memory, RAM) RAMs may be used, for example, a static random access memory (static RAM, SRAM), a dynamic random access memory (dynamic random access memory, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

According to the method provided in the embodiments of this application, this application further provides a computer program product, and the computer program product includes computer program code. When the computer program code is run on a computer, the computer is enabled to perform the method in the embodiment shown in FIG. 2, FIG. 3, and FIG. 4.

According to the method provided in the embodiments of this application, this application further provides a computer-readable medium. The computer-readable medium stores program code. When the program code is run on a computer, the computer is enabled to perform the method in the embodiment shown in FIG. 2, FIG. 3, or FIG. 4.

According to the method provided in the embodiments of this application, this application further provides a system. The system includes the foregoing network device and one or more terminal devices. All or some of the foregoing embodiments may be implemented by using software, hardware, firmware, or any combination thereof. When software is used to implement the embodiments, the foregoing embodiments may be implemented completely or partially in a form of a computer program product. The computer program product includes one or more computer instructions. When the computer program instructions are loaded or executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that, the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods in the embodiments of this application. The foregoing storage medium includes: any medium that can store program code, such as a USB flash drive, a removable hard disk, a read-only memory (Read-Only Memory, ROM), a random access memory (Random Access Memory. RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
    obtaining, by a terminal device, a configuration parameter comprising a channel state information (CSI) process feature;

in response to determining that the CSI process feature indicates that further enhancements to coordinated multi-point (FeCoMP) CSI is enabled, sending, by the terminal device, exclusively uplink control information on a physical uplink channel without sending uplink data on the physical uplink channel; and determining, by the terminal device, a relationship between a resource of the physical uplink channel and the configuration parameter, wherein sending uplink control information on the physical uplink channel without sending the uplink data on the physical uplink channel is independent from the determined relationship.

2. The method according to claim 1, further comprising:
in response to determining that the CSI process feature indicates that the FeCoMP CSI is disabled, sending, by the terminal device, the uplink control information and uplink data on the physical uplink channel.

3. The method according to claim 1, wherein the method further comprises:
receiving, by the terminal device, information about the configuration parameter from a network device.

4. The method according to claim 1, wherein the configuration parameter further comprises one or more of: a feedback feature and a codebook feature.

5. A communication method, comprising:
obtaining, by a network device, a configuration parameter comprising a channel state information (CSI) process feature; and
in response to determining that the CSI process feature indicates that further enhancements to coordinated multi-point (FeCoMP) CSI is enabled, receiving, by the network device, exclusively uplink control information on a physical uplink channel without uplink data on the physical uplink channel, wherein receiving uplink control information on the physical uplink channel without receiving the uplink data on the physical uplink channel is independent from a relationship between a resource of the physical uplink channel and the configuration parameter determined by a terminal device.

6. The method according to claim 5, further comprising:
in response to determining that the CSI process feature indicates that the FeCoMP CSI is disabled, receiving, by the network device, the uplink control information and uplink data on the physical uplink channel.

7. The method according to claim 5, further comprising:
sending, by the network device, information about the configuration parameter to a terminal device.

8. The method according to claim 5, wherein the configuration parameter further comprises one or more of: a feedback feature and a codebook feature.

9. A communications apparatus, comprising:
at least one processor, coupled to a memory and configured to execute one or more programming instruction stored in the memory, to implement operations comprising:
obtaining a configuration parameter comprising a channel state information (CSI) process feature;
in response to determining that the CSI process feature indicates that further enhancements to coordinated multi-point (FeCoMP) CSI is enabled, sending exclusively uplink control information on a physical uplink channel without sending uplink data on the physical uplink channel; and
determining a relationship between a resource of the physical uplink channel and the configuration parameter, wherein sending uplink control information on the physical uplink channel without sending the uplink data on the physical uplink channel is independent from the determined relationship.

10. The apparatus according to claim 9, wherein the operations further comprising:
in response to determining that the CSI process feature indicates that the FeCoMP CSI is disabled, sending the uplink control information and uplink data on the physical uplink channel.

11. The apparatus according to claim 9, wherein the operations further comprising:
receiving information about the configuration parameter from a network device.

12. The apparatus according to claim 9, wherein the configuration parameter further comprises one or more of: a feedback feature and a codebook feature.

13. The apparatus according to claim 9, wherein the apparatus further comprises the memory.

* * * * *